US005460391A

United States Patent [19]

Gantz et al.

[11] Patent Number: 5,460,391

[45] Date of Patent: Oct. 24, 1995

[54] COMBINATION TRAY AND WHEELED CART

[75] Inventors: Carroll M. Gantz, Pittsburgh, Pa.; William C. Sabram, Kentwood, Mich.

[73] Assignee: Leonard Bloom, Towson, Md.

[21] Appl. No.: 113,438

[22] Filed: Aug. 27, 1993

[51] Int. Cl.[6] .................. B62B 3/00

[52] U.S. Cl. .................. 280/30; 108/14; 108/26; 108/129; 280/38; 280/47.35

[58] Field of Search .................. 108/11, 18, 19, 108/129, 26, 14; 280/30, 38, 47.35, 43, 35, 641, 643, 47.34

[56] References Cited

U.S. PATENT DOCUMENTS

| | | | |
|---|---|---|---|
| 886,537 | 5/1908 | McNiven . | |
| 913,943 | 3/1909 | Bown . | |
| 1,178,597 | 4/1916 | Owens . | |
| 2,667,392 | 1/1954 | Sexton | 108/26 |
| 2,672,391 | 3/1954 | Moore | 280/43 X |
| 2,683,639 | 7/1954 | Brenny | 311/17 |
| 2,833,550 | 5/1958 | Frick | 280/47.34 |
| 3,472,392 | 10/1969 | Hahn | 280/47.35 |
| 3,721,349 | 3/1973 | Jaffee et al. | 211/126 |
| 3,853,329 | 12/1974 | McDonald | 280/47.35 |
| 4,872,410 | 10/1989 | Lilly | 108/26 |
| 4,993,726 | 2/1991 | Schumacher et al. | 280/38 |
| 5,082,301 | 1/1992 | Schumacher et al. | 280/38 |
| 5,186,479 | 2/1993 | Flowers | 280/47.35 |
| 5,190,303 | 3/1993 | Schumacher et al. | 280/38 |
| 5,269,545 | 12/1993 | Huebschen et al. | 280/47.35 |

*Primary Examiner*—Kenneth R. Rice
*Assistant Examiner*—Michael Mar
*Attorney, Agent, or Firm*—Leonard Bloom

[57] ABSTRACT

A combination tray and wheeled cart (10) has three positions: an initial storage position with minimum space requirements; an intermediate carrying position configured as a conventional tray provided with an overhead handle for carrying to a job site, and a third erected operational position for mobile use on the job site. The combination tray and wheeled cart (10) is relatively lightweight, yet sturdy, and may be moved from one position into another position quickly and easily. Respective pairs of legs (20, 21) are pivotably mounted to the sides (12, 13) of a tray (11); and balls or casters (25) are provided on the ends of the individual legs (17). A shelf (27) is pivotably carried by one (21) pair of legs (17) and is releasably secured to the other (20) pair of legs (17), thereby structurally bracing the combination tray and wheeled cart (10) in its erected operational position. A variety of insert trays (39–44) adapt the combination tray and wheeled cart (10) for particular purposes.

29 Claims, 19 Drawing Sheets

COMBINATION TRAY AND WHEELED CART

FIELD OF THE INVENTION

The present invention relates to a combination tray and cart and, in particular, to a combination tray and wheeled cart that is useful for a wide variety of purposes.

BACKGROUND OF THE INVENTION

There are numerous articulatable or collapsible stools, carts or trays that have been disclosed in the prior art. One such example is U.S. Pat. No. 1,178,597 issued to Owens in 1916. In this '597 patent, a collapsible support can be folded up into substantially an attache case size, and the legs of the support come together and constitute the handles for carrying the support. This collapsible support, while apparently adequate for the purposes intended, is not suitable for use as a mobile work station and, especially, for a variety of individual purposes.

The prior art also includes U.S. Pat. Nos. 4,993,726; 5,082,301; and 5,190,303 issued to Schumacher et al on Feb. 19, 1991; Jan. 21, 1989 and Mar. 2, 1993, respectively, and assigned to the assignee of the present invention. In these Schumacher et al patents, a painter's mobile work station (as well as an improved method of painting) are disclosed and claimed, wherein the mobile work station may be folded up and carried to the job site and, thereafter, quickly and easily erected for use on the job. While constituting an important contribution to the art, nevertheless, these patents are basically intended for a single-purpose, namely for interior painting, and are not intended to be quickly adapted for a variety of general-purpose uses.

Despite the numerous items on the market, consisting of folding tables, wheeled carts, serving trays, kit boxes, tool boxes and the like—all of which are basically single purpose items—a definite need exists for a combination tray and wheeled cart that is simple and practical, sturdy, economical to manufacture, versatile and lightweight, and may be conveniently carried to the job site and then quickly and easily erected for a wide variety of purposes.

SUMMARY OF THE INVENTION

Accordingly, it is an object of the present invention to provide such a combination tray and wheeled cart that is quickly and easily adapted for a variety of general-purpose uses, such as painting, household cleaning, car washing and waxing, gardening, home repairs, barbecuing and the like, thereby providing a versatile portable mobile work station.

It is another object of the present invention to provide a combination tray and wheeled cart having a first completely-folded low-profile storage position, a second or intermediate position constituting a tray that may be carried to the job site, and a third erected position constituting a wheeled cart that may be moved about the job site.

In accordance with the teachings of the present invention, a preferred embodiment of a combination tray and cart is disclosed, including a tray having a pair of sides. A first pair of spaced-apart legs is pivotably mounted to one of the sides of the tray, and a second pair of spaced-apart legs is pivotably mounted to the other side of the tray. With this structure, the combination tray and cart has a carrying position in which the first and second pairs of legs are disposed above the tray, angularly thereof to substantially form an apex, and in which both pairs of legs define an acute angle with respect to the tray, thereby forming an isoceles triangular configuration. In this carrying position, a handle means is provided for carrying the combination tray and cart to a job site. A first releasable means is provided for retaining the combination tray and cart in its carrying position. This first releasable means may be released to allow the first and second pairs of legs to be pivoted away from each other—outwardly of the respective sides of the tray—and into a position in which the legs depend substantially downwardly of the tray, thereby defining an erected position for the combination tray and cart at the job site; and a second releasable means is provided for retaining the combination tray and cart in this erected position.

The pairs of legs are pivoted about respective axes which are substantially parallel to the respective sides of the tray, but laterally offset therefrom; and the first pair of legs nests within the second pair of legs, thereby defining an initial folded position for storage of the combination tray and cart.

In the preferred embodiment, a shelf is pivotably mounted on the second pair of legs and is disposed below the tray in the erected operational position of the combination tray and cart, thereby bracing the combination tray and cart and improving the structural integrity thereof.

Each leg has a distal end remote from the pivotable mounting of the leg; and a caster means is provided on the distal end of each leg, such that the combination tray and cart may be easily moved about the job.

Viewed in another aspect, the present invention provides an improved mobile cart including a tray means having respective first and second pairs of legs pivotably mounted thereto. The first and second pairs of legs are folded substantially flat with respect to the tray means, thereby defining a first storage position for the mobile cart. The first and second legs may be pivoted (partially) away from the tray means so as to be disposed above the tray means, thereby defining a second intermediate carrying position for the mobile cart; and a handle means is provided for carrying the cart to a job site. Thereafter, the first and second pairs of legs may be pivoted further away from each other, outwardly of the tray means, and into a position in which the first and second pairs of legs depend downwardly of the tray means, thereby defining a third operational position for the mobile cart on the job site.

An insert tray may be removably received within the tray means, thereby facilitating use of the combination tray and mobile cart for a particular purpose, such as interior painting, home repairs, gardening, general household cleaning, barbecuing, car washing and waxing, and the like.

Viewed in yet another aspect, the present invention provides a combination tray and wheeled cart, including a frame means having a handle and further having a plurality of articulated legs. The combination tray and wheeled cart has a first storage position, a second intermediate carrying position in which the combination tray and wheeled cart is carried by the handle to a job site, and a third erected operational position in which the articulated legs are extended from the frame means, respectively. A plurality of insert trays is provided, such that a selected insert tray may be removably received on the frame means at the job site; and each of the insert trays has a plurality of divider walls separating the respective insert tray into a plurality of compartments suitable for a particular purpose.

These and other objects of the present invention will become apparent from a reading of the following specification taken in conjunction with the enclosed drawings.

GENERAL DESCRIPTION OF THE PREFERRED EMBODIMENTS

Figure 1:
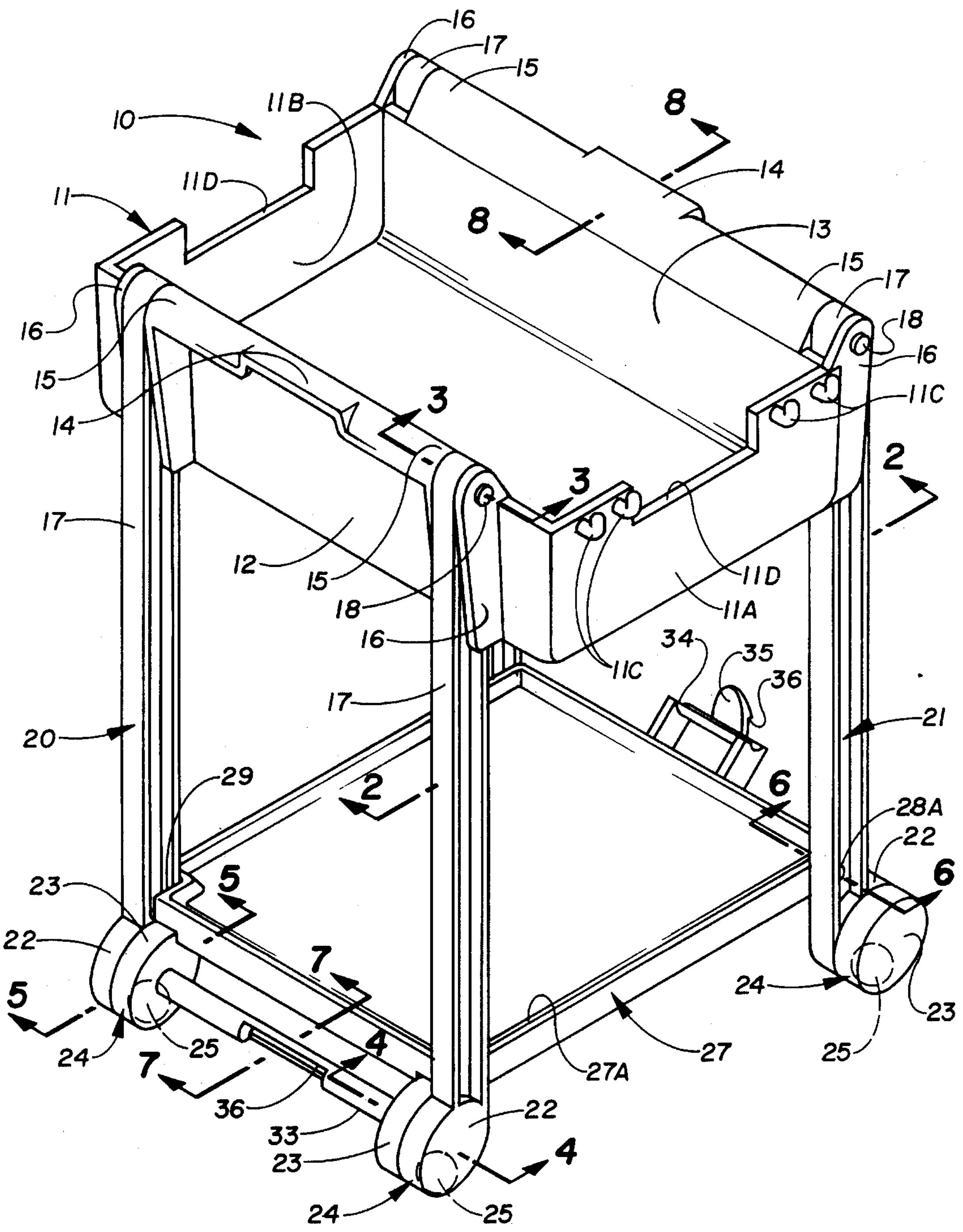
FIG. 1 is an isometric view of the combination tray and wheeled cart of the present invention, shown in its third erected (or operational) position for mobile use on a job site.

With reference to FIGS. 1–8, the combination tray and wheeled cart 10 of the present invention includes a tray 11 which, preferably, is substantially rectangular and has parallel sides 12 and 13, respectively. Suitable handles 14 are carried by the respective sides 12 and 13 of the tray 11 (preferably being integrally molded therewith) for pushing or pulling the combination tray and wheeled cart, as shown more clearly in FIG. 8. The tray 11 also has end walls 11A and 11B, one of which (11A) is provided with a series of hooks 11C for hanging cloths or tools (not shown). Each of the respective sides 12 and 13 of the tray 11 has two pairs of spaced-apart cooperating bosses 15 and 16, respectively, preferably integrally molded therewith, and constituting an inner boss 15 and an outer boss 16. Each pair of cooperating bosses 15 and 16 has a leg 17 pivotably mounted therebetween by means of a pin 18 and a push-on nut 19. The pivot axis of each leg 17 is parallel to, and laterally offset from, the respective side (12 or 13) of the tray 11, as shown more clearly in FIG. 3. Two of the legs 17 are arranged as a first pair 20 pivotably mounted to side 12 of the tray 11, and the other two legs 17 are arranged as a second pair 21 pivotably mounted to side 13 of the tray 11. Since the legs 17 are identical, the legs 17 on the first pair 20 are oriented 180° with respect to the legs 17 on the second pair 21, as shown more clearly in FIG. 1. With this arrangement, the first pair 20 of legs 17 will nest within the second pair 21 (as hereinafter described).

Figure 4:
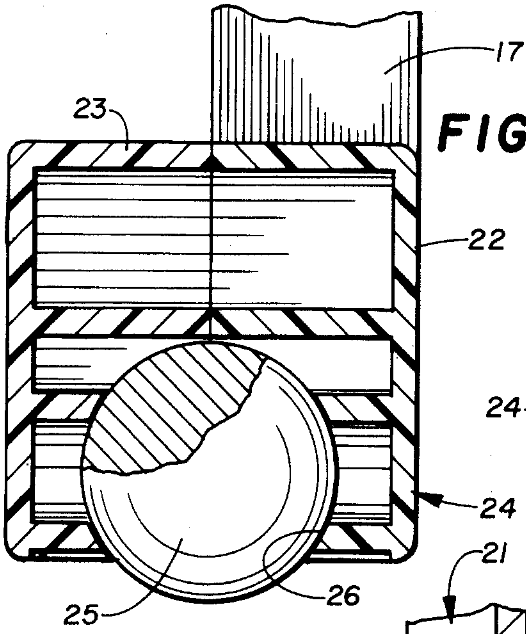
FIG. 4 is a detailed cross-sectional view, taken along the lines 4—4 of FIG. 1 and drawn to an enlarged scale, and showing a spherical ball trapped between respective caps, one of which is integrally formed with a respective leg, to provide a caster means for the wheeled cart.

The lower end of the respective legs 17 is enlarged to form an integrally-molded cap 22. A separate cap 23 is secured to the integral cap 22 (by an adhesive or other suitable means). The caps 22 and 23, respectively, form a caster housing 24 having a spherical ball 25 trapped therein. The ball 25 extends below an opening 26 formed in the caster housing 24; and the ball 25 is free to swivel around, thereby forming a caster means on the end of each leg 17. In FIG. 4, the ball 25 is shown as a metal ball; however, it will be appreciated that the ball 25 may be molded from a suitable plastic, if desired, consonant with the teachings of the present invention.

Each of the legs 17 is identical and is formed as an "I" beam or "I" section. The legs 17 of the first pair 20 are reversed 180° with respect to the legs 17 of the second pair 21. As a result, and as shown more clearly in FIG. 1, the separate caps 23 are on the inside of the integral caps 22 on the legs 17 in the first pair 20, and are on the outside of the second pair 21.

Figure 2:
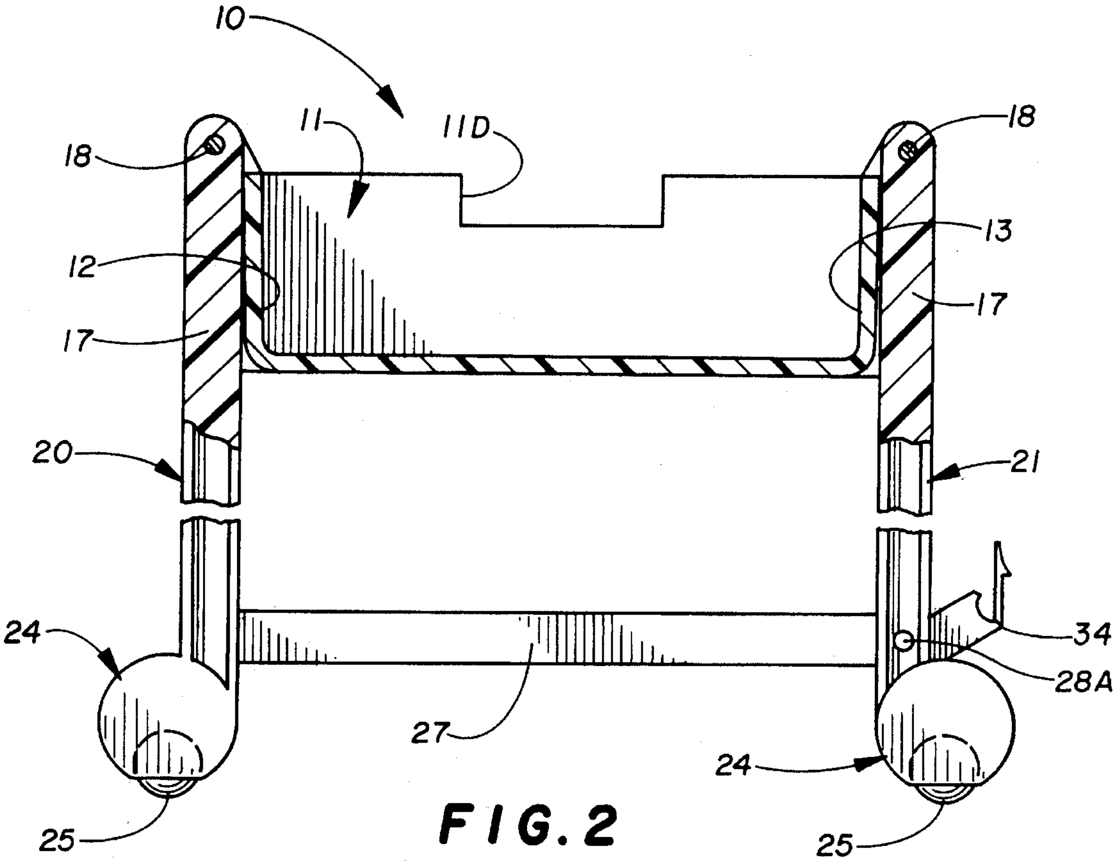
FIG. 2 is a cross-sectional view thereof, taken along the lines 2—2 of FIG. 1.
Figure 3:
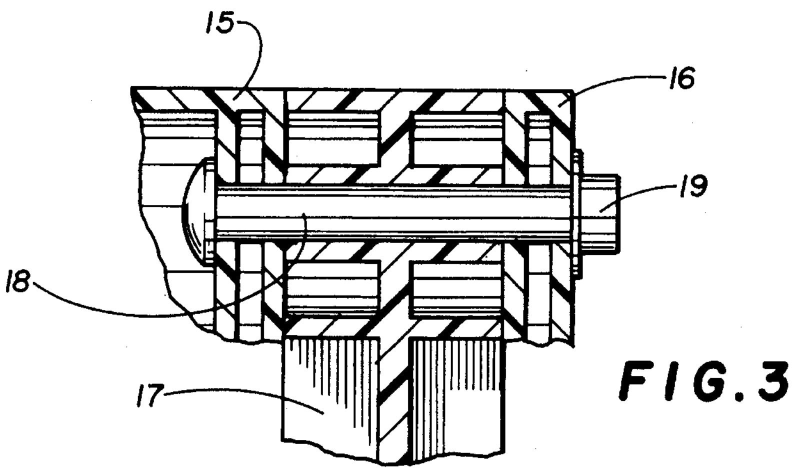
FIG. 3 is a detailed cross-sectional view thereof, taken along the lines 3—3 of FIG. 1 and drawn to an enlarged scale, and showing how each of the respective legs is pivotably mounted to the tray.
Figure 5:
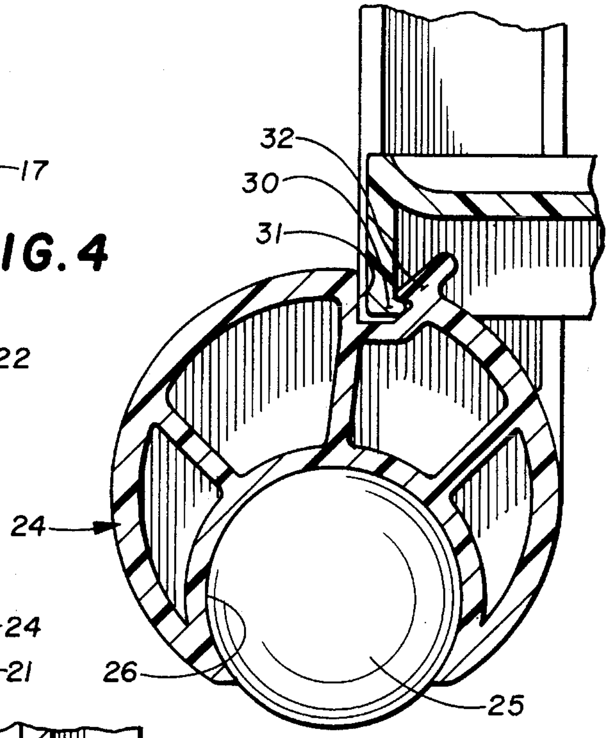
FIG. 5 is a detailed cross-sectional view, taken along the lines 5—5 of FIG. 1 and drawn to an enlarged scale, showing one of the casters, and further showing the releasable mounting means between a lower shelf (pivotably carried by the second pair of legs) and the respective inner caps on the first pair of legs.
Figure 6:
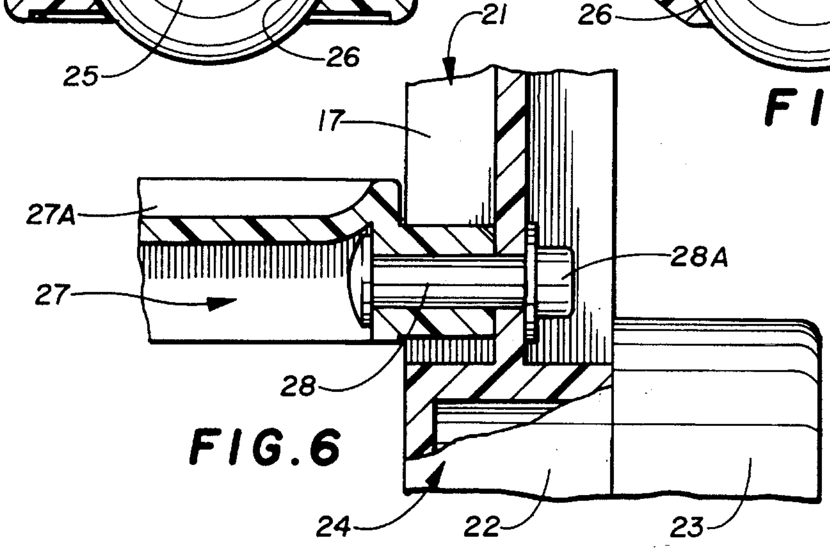
FIG. 6 is a detailed cross-sectional view, taken along the lines 6—6 of FIG. 1 and drawn to an enlarged scale, and showing a lower shelf pivotably mounted on the second set of pivoted legs.
Figure 7:
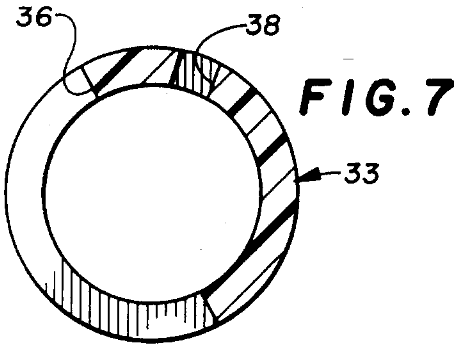
FIG. 7 is a detailed cross-sectional view, taken along the lines 7—7 of FIG. 1 and drawn to an enlarged scale, and showing a notch in the tubular axle between the first pair of pivoted legs, the notch receiving a tab on the handle (formed integrally with the pivoted shelf) when the combination tray and wheeled cart is in its second intermediate carrying position.
Figure 8:
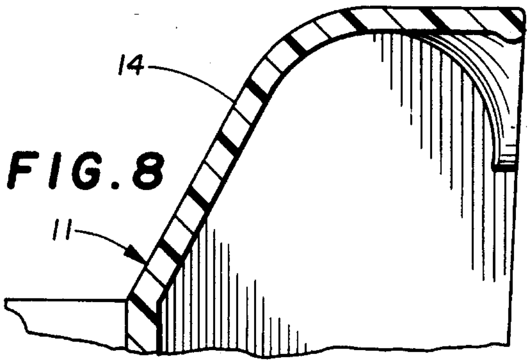
FIG. 8 is a detailed cross-sectional view, taken along the lines 8—8 of FIG. 1 and drawn to an enlarged scale, and showing a handle integrally molded with the tray, the handle being used to push or pull the combination tray and wheeled cart (in its third erected operational position) at the job site.

A shelf 27 (having a rim 27A) is pivotably carried by the second pair of legs 21 by means of aligned pivot pins 28, one of which is shown in FIGS. 2 and 6, and respective push-on nuts 28A. The distal end of the shelf 27 (remote from the pivot pins 28) has a pair of cut-out portions, one of which is shown at 29 in FIG. 1, to nest within the first pair 20 of the legs 17. The shelf 27 has a spaced-apart pair of hooks 30; and each hook 30, as shown more clearly in FIG. 5, is releasably seated in a complementary opening 31 formed in the inner cap 23 on the first pair 20 of legs 17. The hooks 30 are "popped" or "snapped" into the respective openings 31 and are retained against respective ledges 32 adjacent to the openings 31. While sufficient for retaining the assembly, the hooks 30 may be manually released by simply pulling up on the shelf 27; and, thereafter, the shelf 27 may be pivoted back into its original position.

The shelf 27 has a two-fold purpose: First, the shelf 27 braces the combination tray and wheeled cart 10 in its third erected operational position, thereby improving the structural integrity thereof. Second, the shelf 27 provides additional room for holding various implements or accessories (as hereinafter described in detail).

Figure 16:
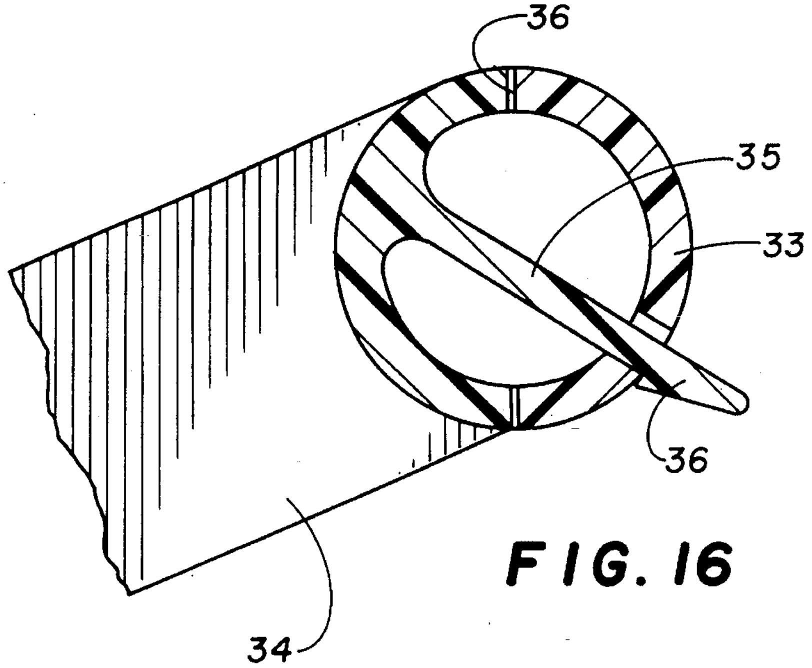
FIG. 16 is a cross-sectional view, taken along the lines 16—16 of FIG. 12 and drawn to an enlarged scale, and showing the tab on the overhead handle (on the shelf pivotably mounted on the second pair of legs) received in a notch on the axle for the first pair of legs, thereby retaining the combination tray and wheeled cart in its second carrying position.

With reference again to FIGS. 1 and 7, and with further reference to FIG. 16, the first pair 20 of pivoted legs 17 is provided with a tubular member 33 (in the form of an axle) between the respective inner caps 23 thereon. The pivoted end of the shelf 27 has a U-shaped handle 34 molded integrally therewith; and the handle 34, in turn, has a tab 35. This tab 35 is received within a slot 36 in the tubular member 33; and a hook 37 on the tab 35 cooperates with a notch 38 in the tubular member 33, as shown more clearly in FIG. 16, thereby releasably retaining the combination tray and wheeled cart 10 in its second intermediate carrying position.

The combination of the hook 37 on the tab 35 engaging the notch 38 on the tubular member 33 comprises a first means for releasably retaining the combination tray and wheeled cart 10 in its second intermediate carrying position; and the hooks 30 and cooperating ledges 32 provide a second means for releasably retaining the combination tray and wheeled cart 10 in its third erected (operational) position.

Thus, the basic combination tray and wheeled cart 10 of the present invention includes the tray 11, four legs 17 each of which is identical, two separable caps 23 for the second pair 21 of legs 17, a tubular member 33 having two caps 23 integrally molded therewith, four caster balls 25 and a shelf 27. The associated hardware consists of two pivot pins 18 and two push-on nuts 19 (for the legs 17) and two pivot pins 28 (for the shelf 27) and their respective push-on nuts 28A. The economy of parts and the interchangeability of the legs 17 contribute to the low-cost manufacture of the combination tray and wheeled cart 10.

In its initial storage position, the combination tray and wheeled cart 10 is very compact and occupies a minimum volume, so that the product may be economically shipped fully assembled or, if desired, "KD" (knocked-down) for easy assembly by the purchaser.

Figures 9, 10, 11, 12, 13, 14, 15:
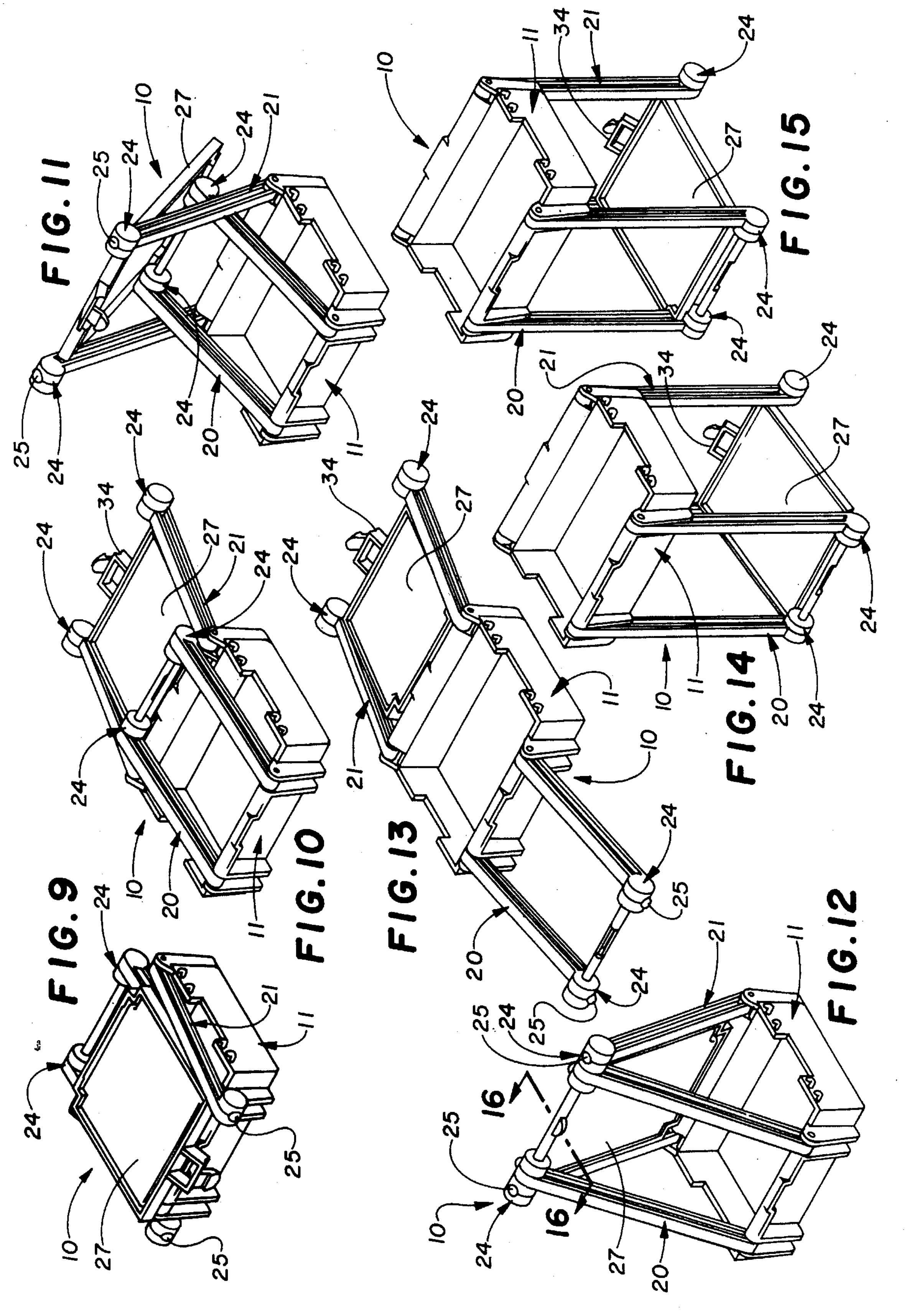
FIGS. 9–15 are pictorial views illustrating the respective steps in unfolding and erecting the combination tray and wheeled cart of the present invention, thereby providing a first storage position, a second intermediate carrying position, and a third erected operational position, respectively.

With reference to FIGS. 9–16, the combination tray and wheeled cart 10 preferably has three basic positions: a first storage position, a second intermediate carrying position, and a third erected operational mobile position, respectively. From its initial storage position (FIG. 9) wherein the first pair of legs 20 nests within the second pair of legs 21, the legs are swung or pivoted (FIGS. 10 and 11 and the location thereof) and into the second intermediate carrying position (FIG. 12).

Figure 17:
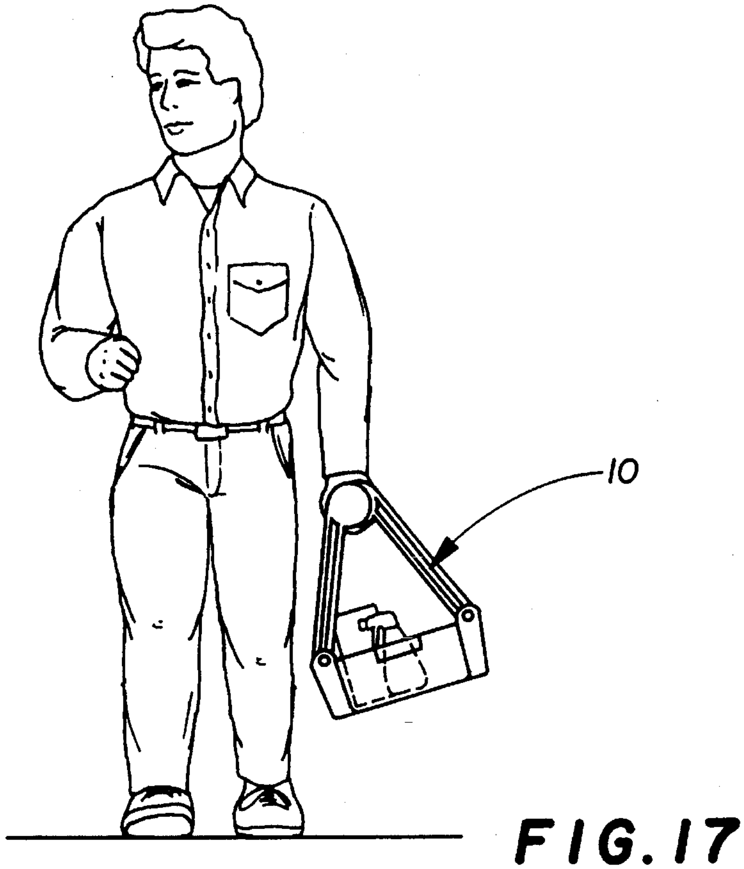
FIG. 17 is a pictorial view, showing a person carrying the combination tray and wheeled cart to a job site, and further showing the manner in which the combination tray and wheeled cart may tend to shift laterally away from the person.

In this intermediate carrying position, the combination tray and wheeled cart 10 basically functions as a tray for carrying tools, utensils and accessories to a job site. In this position, the pairs of legs 20 and 21, respectively, are disposed above the tray 11 and are substantially in a triangular configuration with respect to the tray 11, thereby forming an apex substantially adjacent to the overhead carrying handle 34. Each of the pairs of legs 20 and 21, respectively, forms an acute angle with respect to the tray 11; and, the center of gravity of the combination tray and wheeled cart 10 is such (depending upon the weight of the tools and accessories in the tray 11 and the location thereof) that the combination tray and wheeled cart 10 will tend to shift laterally away from the person carrying the combination tray and wheeled cart 10 to the job site (as shown in FIG. 17).

Thereafter, and as shown more clearly in FIG. 13, the tab 35 on the handle 34 may be pulled out of the notch 38 to disengage the hook 37 and, thereafter, the respective pairs of legs 20 and 21 may be further swung or pivoted outwardly away from each other (FIG. 13) and downwardly to depend from the tray 11 (FIG. 14). Thereafter, the hooks 30 on the distal end of the shelf 27 (remote from the pivot pins 28) may be snapped into the openings 31 on the caps 23 on the tubular member 33 (FIG. 15) thereby bracing the combination tray and wheeled cart 10 in its third erected or operational position.

In this third erected position, the balls 25 (forming the caster means) allow the combination tray and wheeled cart 10 to be fully moved about the job site. Preferably, all of the balls 25 are universal, that is, free wheeling in all directions. If desired, however, two of the balls 25 or casters (on the first pair of legs 20) could be free-wheeling, and the other pair of balls 25 or casters (on the second pair of legs 21) could be unidirectional (not shown herein). Further, and if desired, only one set of balls 25 or casters could be employed.

Another unique feature and advantage of the combination tray and wheeled cart 10 of the present invention is its versatility. As shown in FIGS. 18–32, a variety of interchangeable sub-trays or insert trays 39–44 are provided for quickly adapting the combination tray and wheeled cart 10 to a particular task or purpose.

Figure 32:
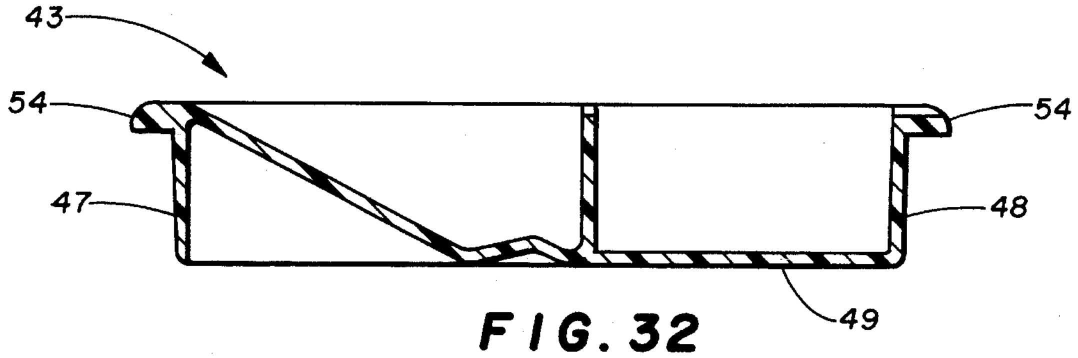
FIG. 32 is a cross-sectional view thereof, taken along the lines 32—32 of FIG. 31.
Figure 33:
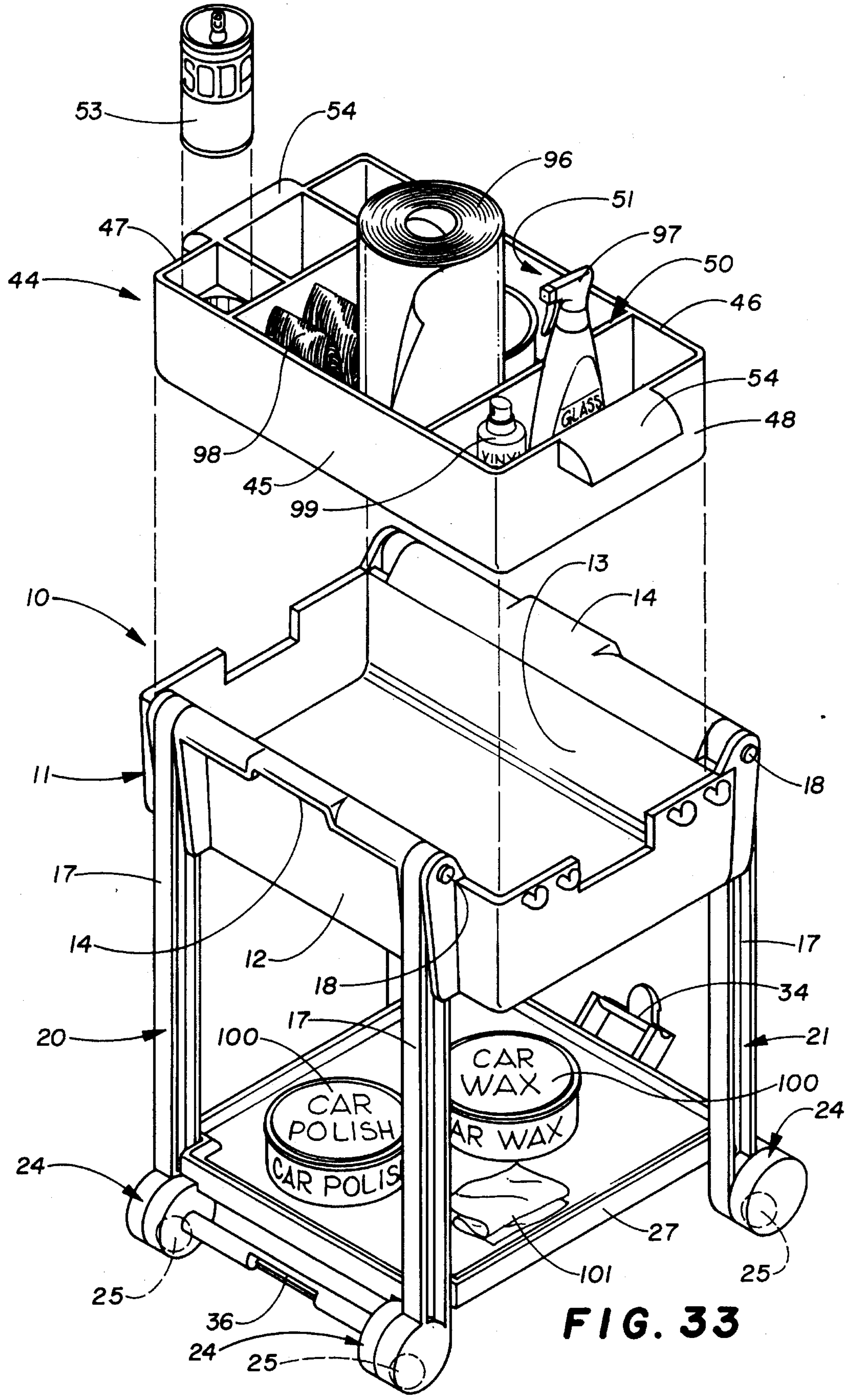
FIG. 33 corresponds to FIG. 18, but shows an insert tray adapted for car cleaning and waxing.
Figure 34:
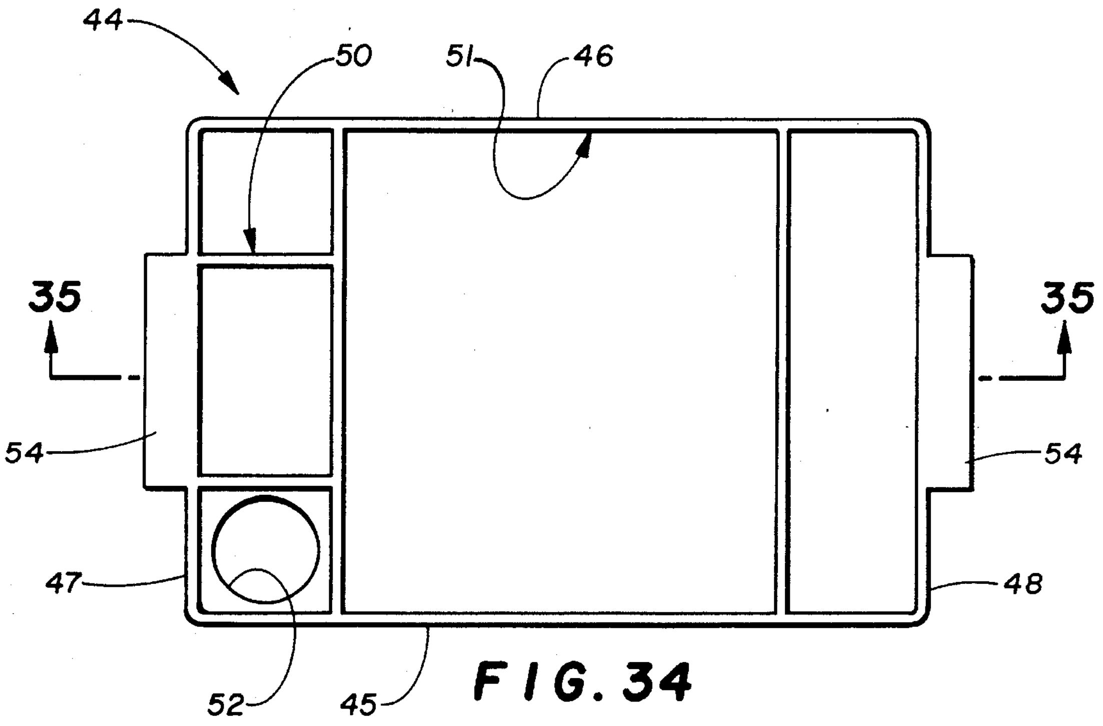
FIG. 34 is a top plan view of the insert tray of FIG. 33.
Figure 35:
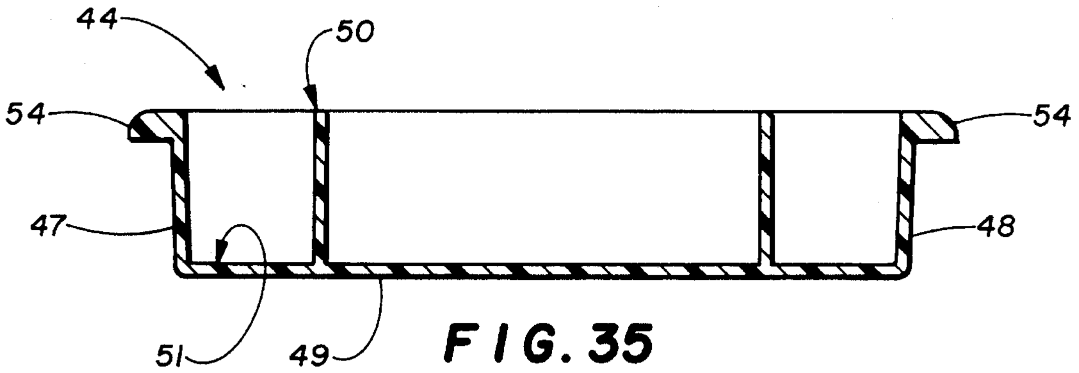
FIG. 35 is a section view, taken along the lines 35—35 of FIG. 34.

Accordingly, insert tray 39 is intended for painting (FIGS. 18–20); insert tray 40 for do-it-yourselfers ("D.I.Y.") and home repairs (FIGS. 21–23); insert tray 41 for gardening (FIGS. 24–26); insert tray 42 for household cleaning (FIGS. 27–29); insert tray 43 for bar-b-queing (FIGS. 30–32); and insert tray 44 for car cleaning and waxing (FIGS. 33–35).

Each insert tray 39–44, respectively, is formed as a substantially rectangular tray having respective side walls 45 and 46 joined by end walls 47 and 48 and a bottom wall 49, respectively, thereby forming a well therebetween. The insert trays 39–44 further have at least one and, preferably, a plurality of divider walls generally designated at 50 for dividing the insert tray 39–44 into a plurality of compartments (generally designated at 51) and tailored for particular end uses or purposes.

The bottom wall 49 of each insert tray 39–44 has an annular indentation 52 formed therein for receiving a standard soda or beverage can 53, and this is a common feature of each of the insert trays 39–44. Additionally, each insert tray is provided with integrally-molded handles 54 at each end thereof, so that the particular insert tray 39–44 may be dropped into (and alternately lifted out of) the tray 11. The handles 54 on the insert tray 39–44 fit within respective cut-outs lid in the end walls 11A and 11B, respectively, of the tray 11.

Figure 18:
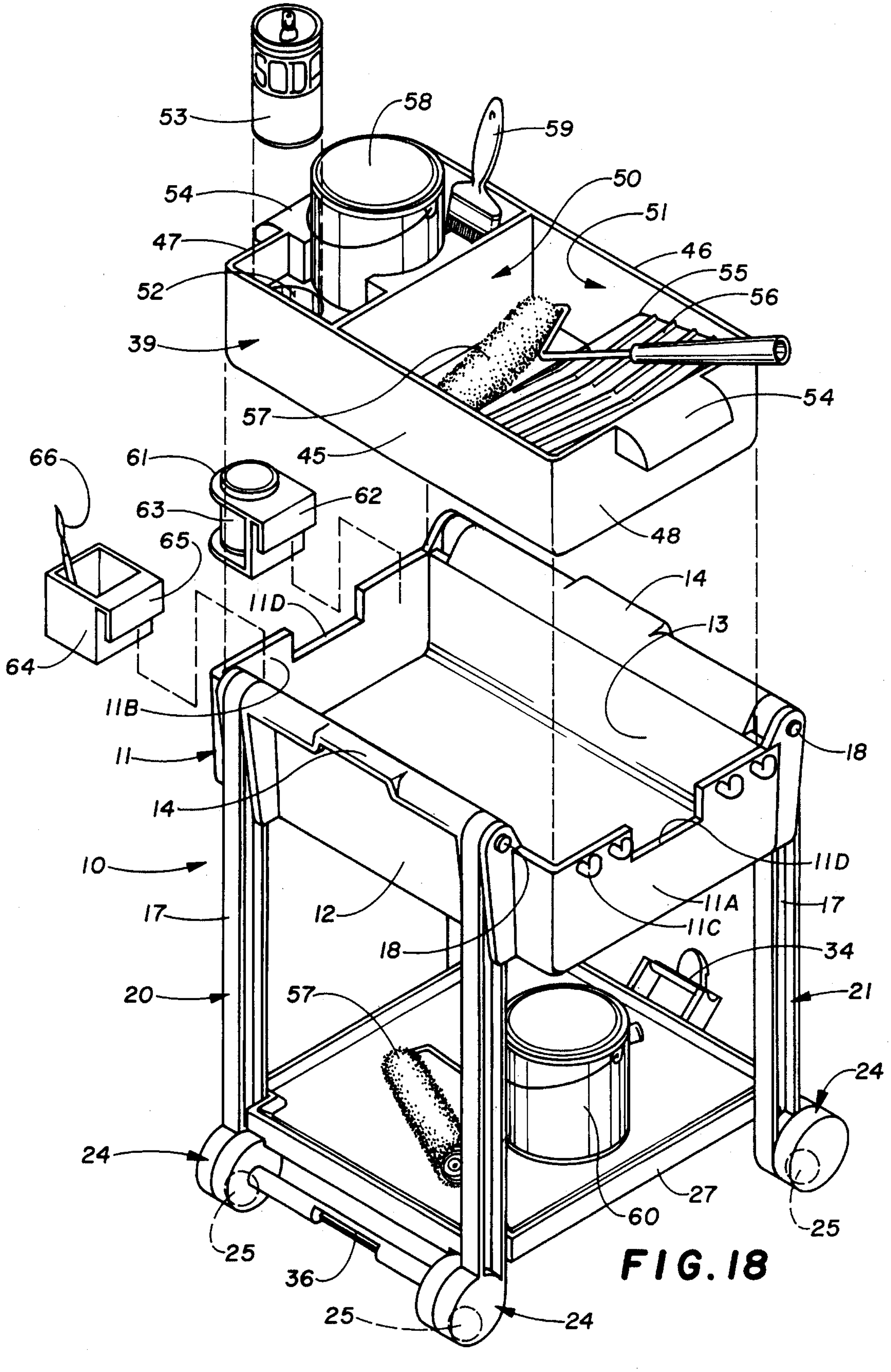
FIG. 18 is a perspective view showing the combination tray and wheeled cart in its third erected position, and further showing (in exploded relationship thereto) an interchangeable insert tray to adapt the combination tray and wheeled cart for interior painting.
Figure 19:
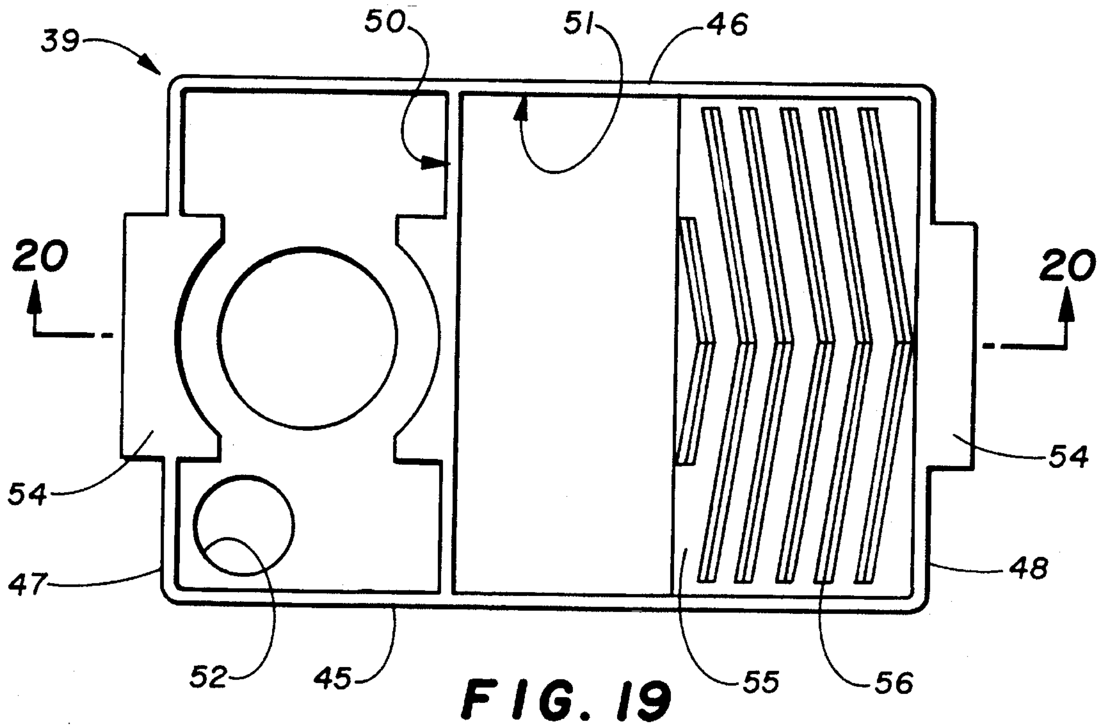
FIG. 19 is a top plan view of the insert tray of FIG. 18 (the tools and accessories being removed therefrom).
Figure 20:
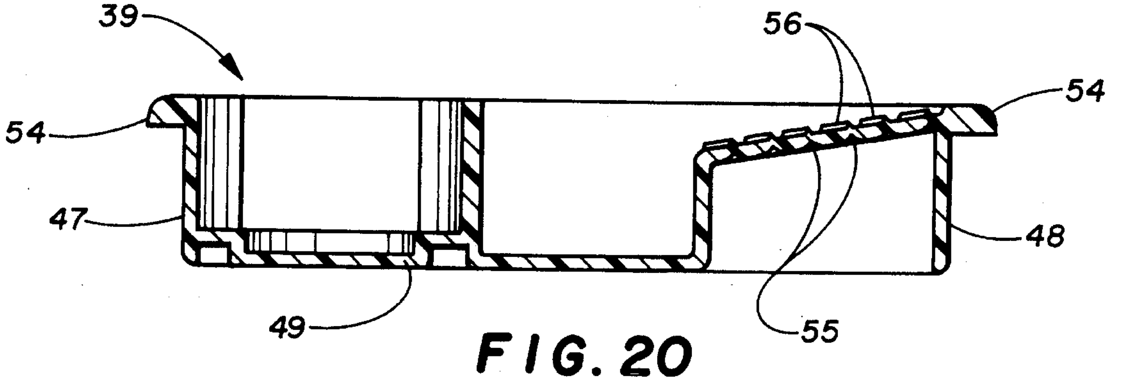
FIG. 20 is a cross-sectional view thereof, taken along the lines 20—20 of FIG. 19.

With reference to FIGS. 18–20, the insert tray 39 is adapted for painting. One of the compartments 51 in this insert tray 39 is disposed between the side walls 45 and 46, respectively, and has a sloping internal wall 55 disposed longitudinally of the insert tray 39, such that the compartment 51 has a shallow end and a deep end and is intended for holding paint. In a preferred embodiment, approximately a full gallon of paint may be held in the compartment 51 of the insert tray 39 without the danger of spilling over, which is a distinct advantage over the customary paint pans which are usually placed on the floor and, sometimes, on a ladder. Moreover, conventional paint pans usually hold around a half-gallon of paint without spillage, depending upon the size of the pan, while the insert tray 39 of the present invention holds a gallon of paint without spillage and, especially, at a convenient height. The sloping internal wall 55 has a plurality of spaced-apart transverse ribs 56 for cooperating with a roller 57 to remove excess paint therefrom. The insert tray 39 may also hold a gallon paint can 58 or a quart paint can (not shown) in its smaller indentation 58A (FIG. 19) and a brush 59 or other accessories (not shown) and the shelf 27 may hold a large paint can 60 as well as another "dry" roller 57. The weight of the paint can 60 on the shelf 27 provides further stability for the mobile combination tray and wheeled cart 10. Additionally, a clip-on holder 61 has a bracket 62 for engaging the end wall 11B on the main tray 11, thereby holding a can of spackle 63. A second clip-on holder 64 has a bracket 65 and, if desired, another paint brush 66 may be carried in the holder 64 for cut-in and touch-up work normally required in the interior painting of homes, offices and other structures.

This combination of the present invention—constituting the painter's insert tray 39 and the combination tray and wheeled cart 10—saves time on the job, avoids messy spills and clean-ups, and avoids deep bending to apply paint to the roller 57, thereby substantially reducing the painter's efforts and resulting fatigue.

Figure 21:
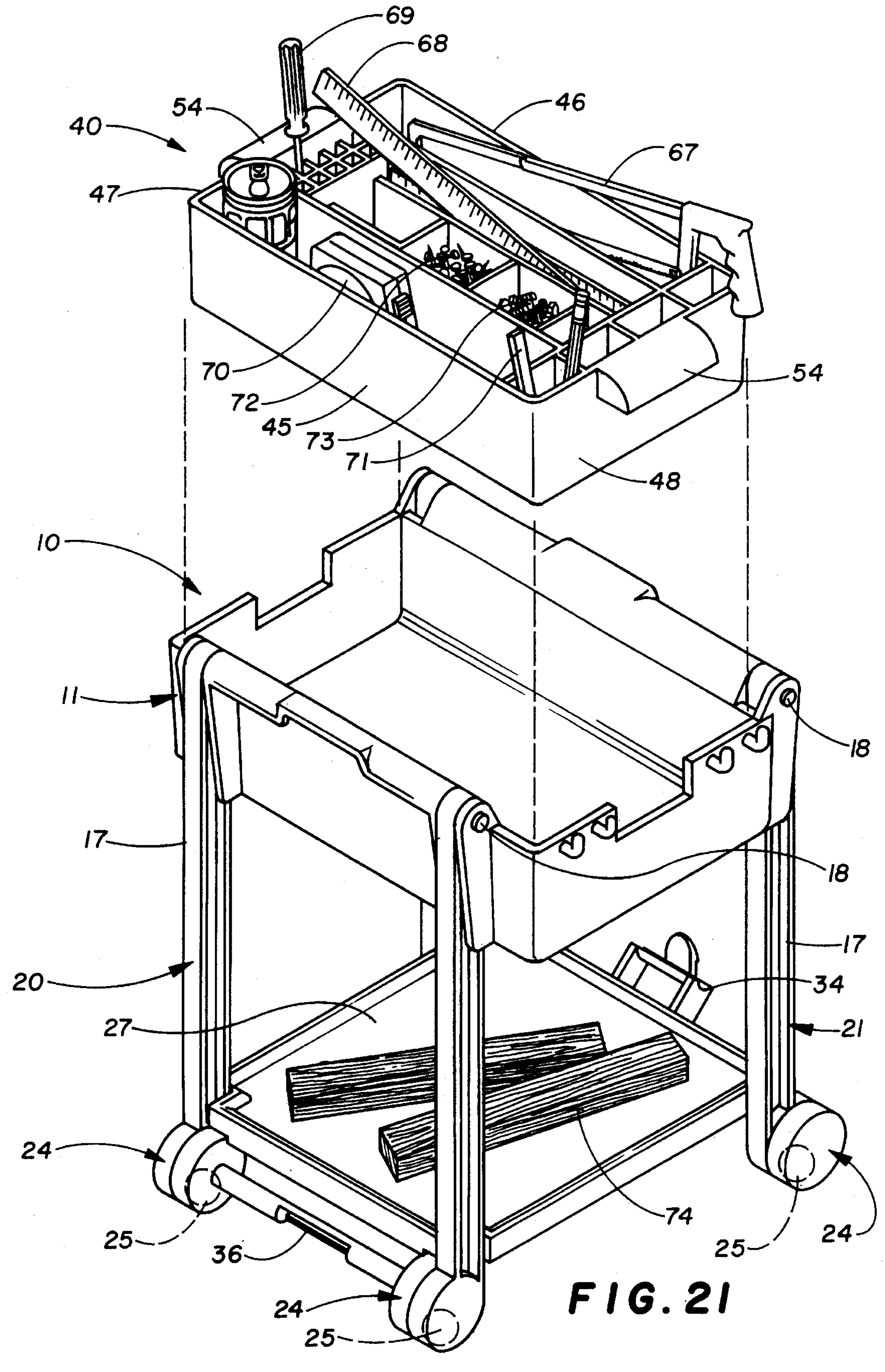
FIG. 21 corresponds substantially to FIG. 18, but shows the combination tray and wheeled cart having an insert tray adapted for general handyman or repair purposes.
Figure 22:
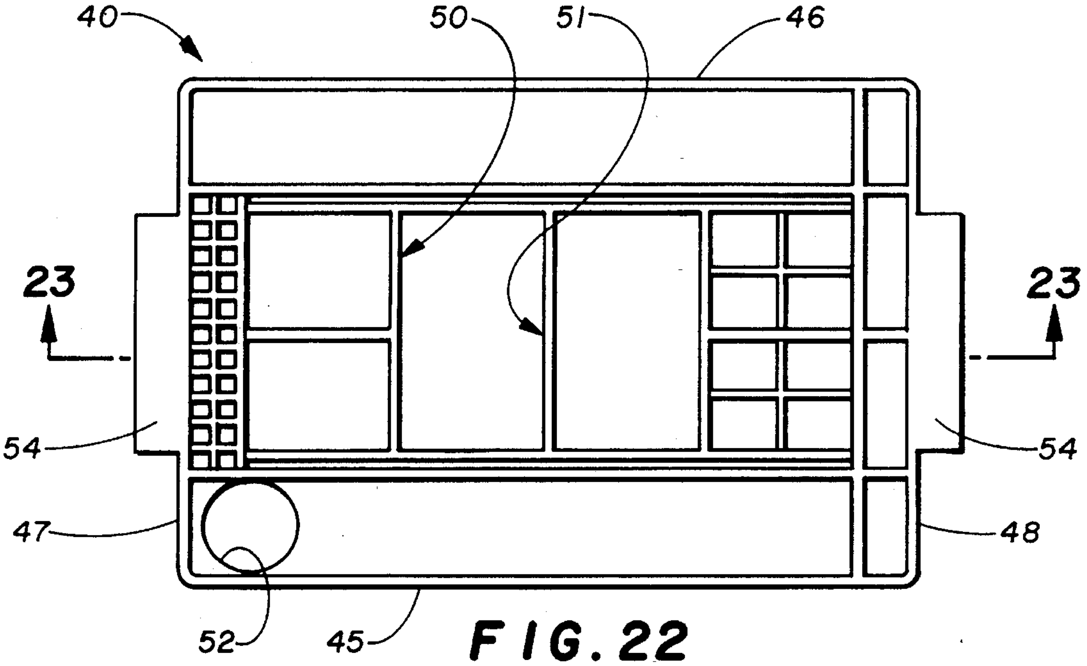
FIG. 22 is a top plan view of the insert tray of FIG. 21.
Figure 23:
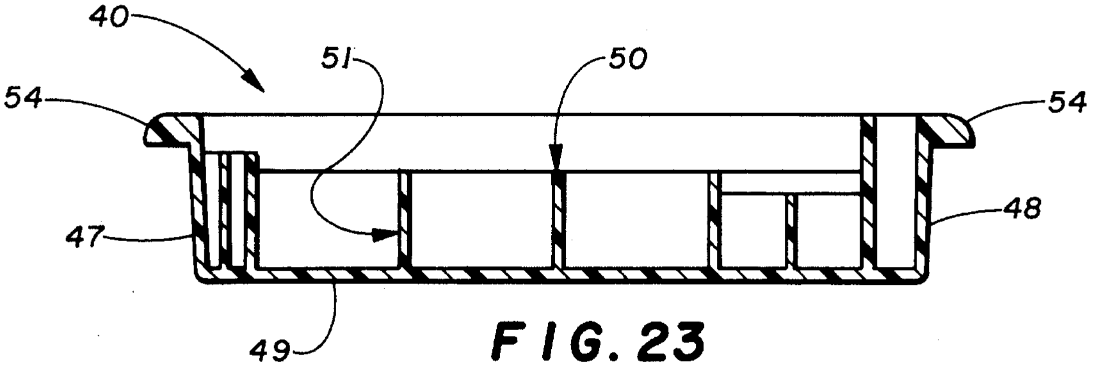
FIG. 23 is a cross-sectional view thereof, taken along the lines 23—23 of FIG. 22.

With reference to FIGS. 21–23, the insert tray 40 adapts the combination tray and wheeled cart 10 for the "do-it-yourselfer" for general household repairs, carpentry, or working on the car. This compartmentalized insert tray 40 may hold, for example, a hacksaw 67, scale 68, screwdriver 69, flexible tape 70, pencils 71, nails 72 and screws 73 as well as other tools and accessories (not shown) normally found in a tool box. The central section of the insert tray 40 may also hold a conventional tool box, if desired. Various items, such as the wood pieces 74, may be supported on the shelf 27.

Figure 24:
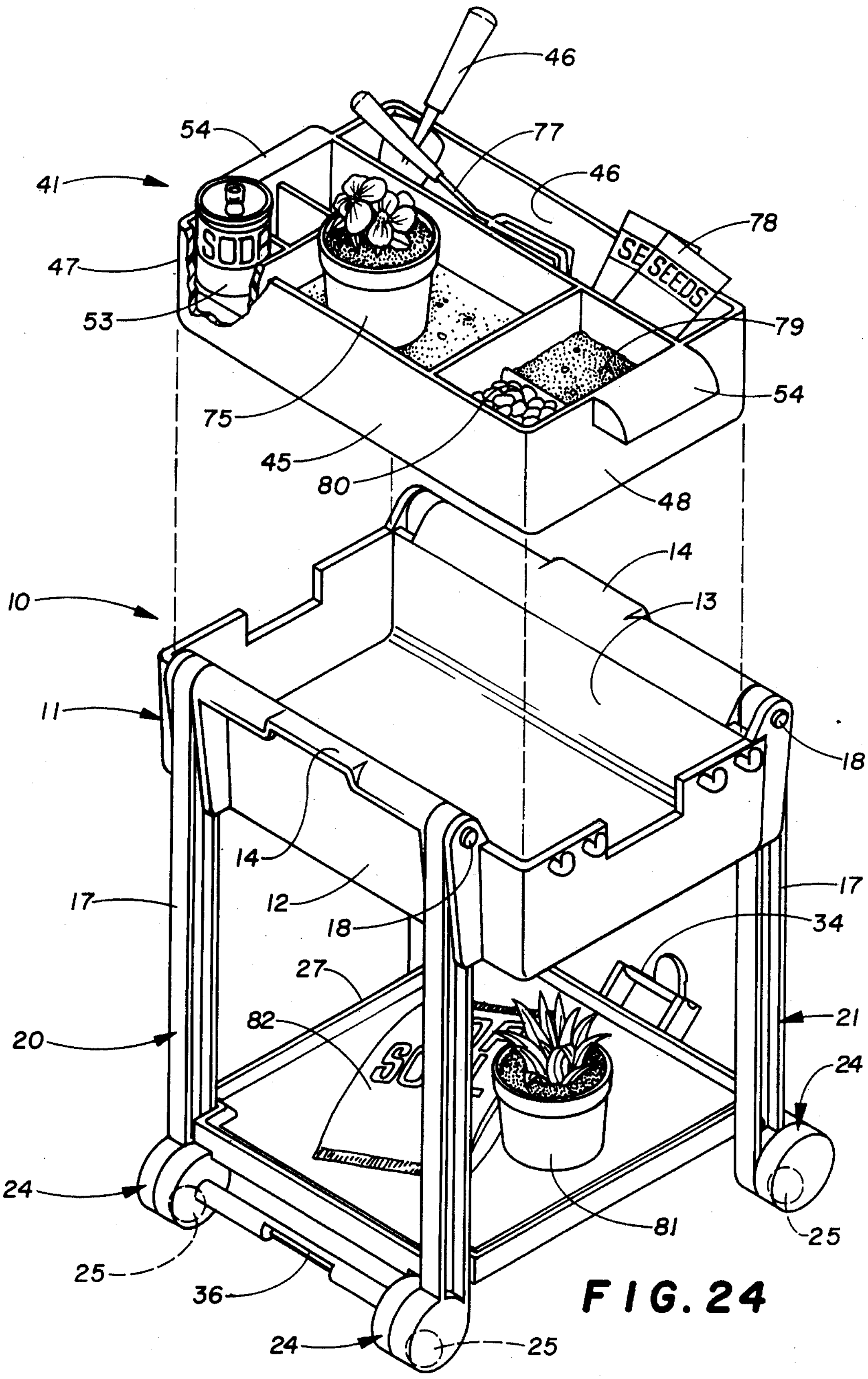
FIG. 24 corresponds substantially to FIG. 18, but shows an insert tray adapted for gardening.
Figure 25:
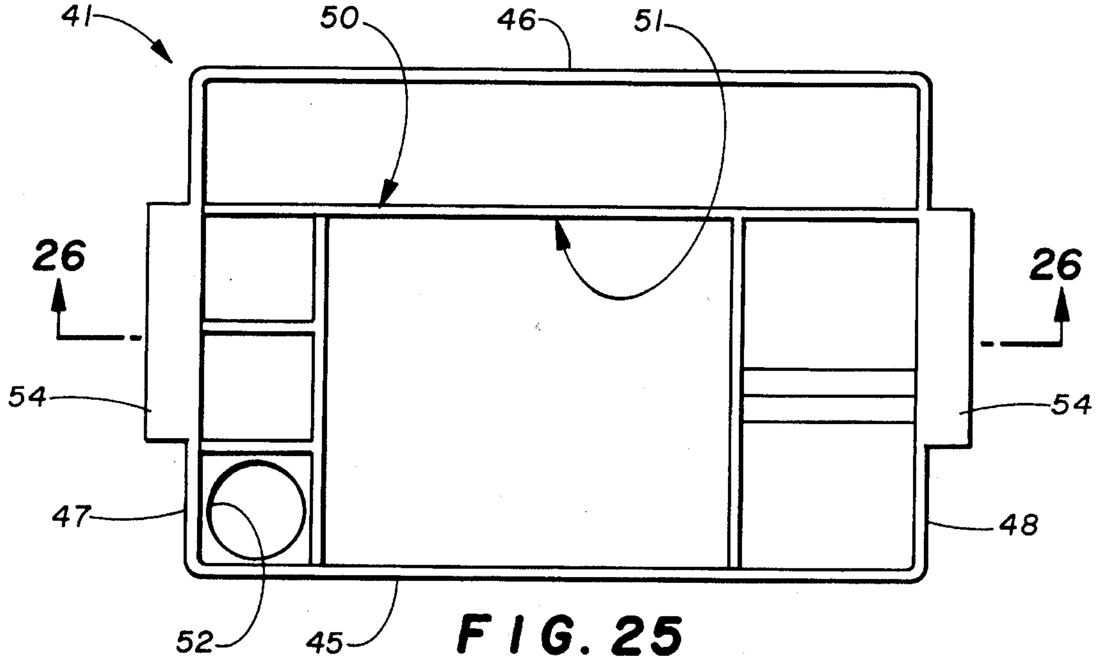
FIG. 25 is a top plan view of the insert tray of FIG. 24.
Figure 26:
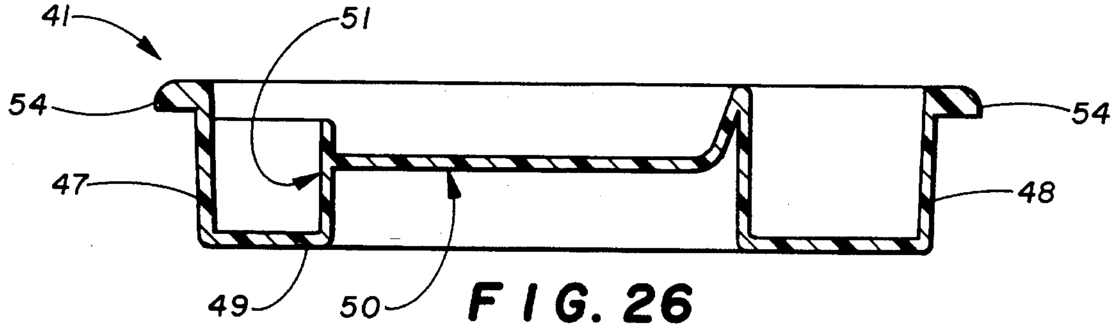
FIG. 26 is a cross-sectional view thereof, taken along the lines 26—26 of FIG. 25.

With reference to FIGS. 24–26, the insert tray 41 adapts the combination tray and wheeled cart 10 to outdoor gardening or for use in a greenhouse. The compartmentalized insert tray 41 may hold a small potted plant 75, a trowel 76 for digging, a claw or handheld rake 77, packets of seeds 78, top soil 79, small stones 80 or other items (not shown) normally used by a gardener. Additionally, a large potted plant 81 and a bag of top soil 82 may be supported on the shelf 27.

Figure 27:
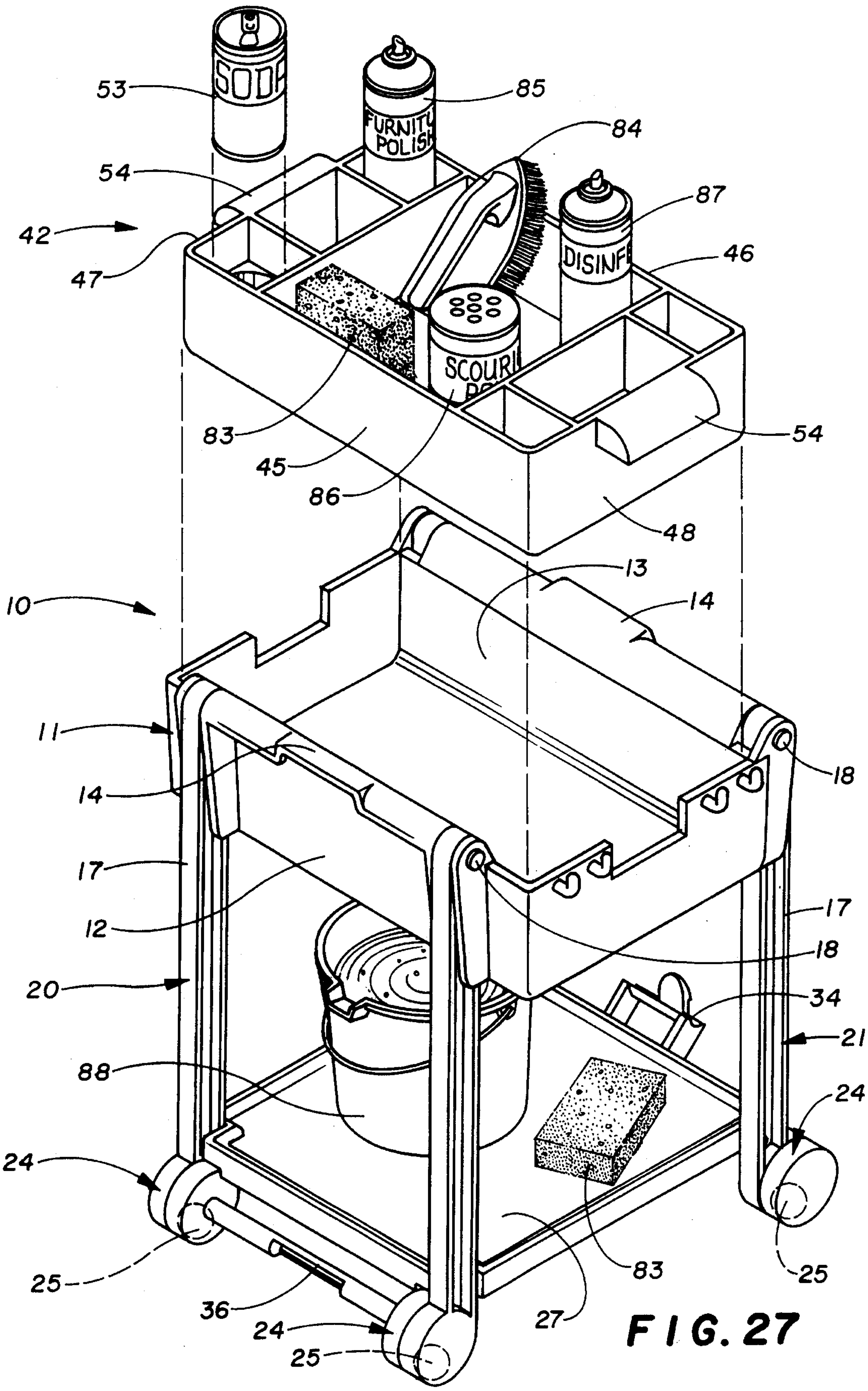
FIG. 27 corresponds substantially to FIG. 18, but shows an insert tray adapted for general household cleaning.
Figure 28:
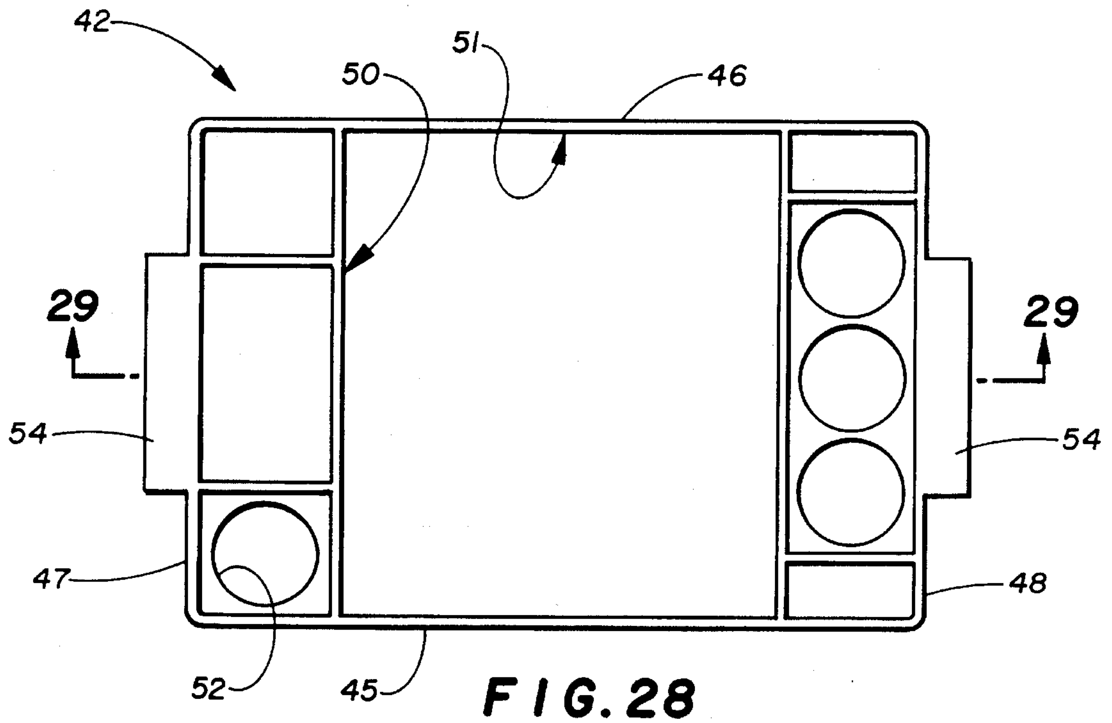
FIG. 28 is a top plan view of the insert tray of FIG. 27.
Figure 29:
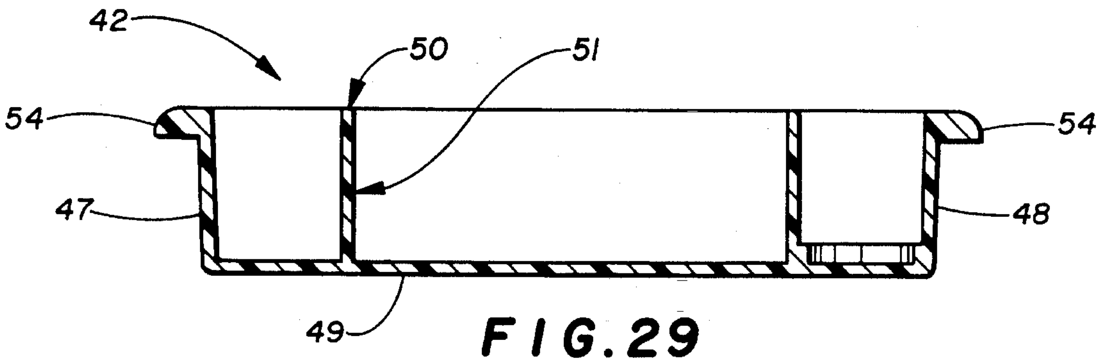
FIG. 29 is a cross-sectional view thereof, taken along the lines 29—29 of FIG. 28.

With reference to FIGS. 27–29, the insert tray 42 adapts the combination tray and wheeled cart 10 for general-purpose household cleaning. The compartmentalized insert tray 42 may hold, for example, a sponge 83, a scrub brush 84, furniture polish 85, scouring cleanser 86 and a disinfectant spray can 87. An extra sponge 83 and a bucket of water 88 may be supported on the shelf 27.

Figure 30:
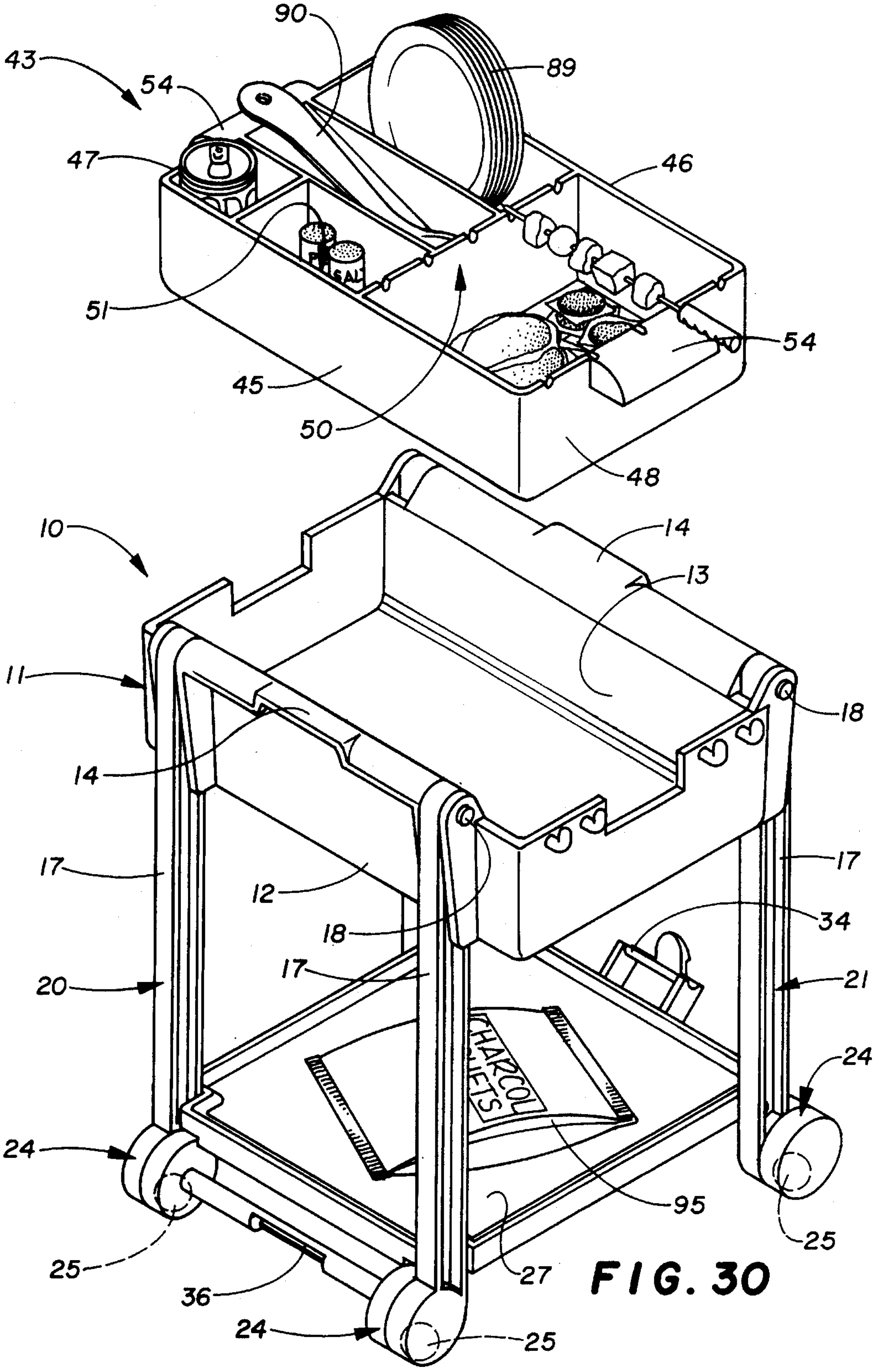
FIG. 30 corresponds substantially to FIG. 18, but shows an insert tray adapted for bar-b-queing.
Figure 31:
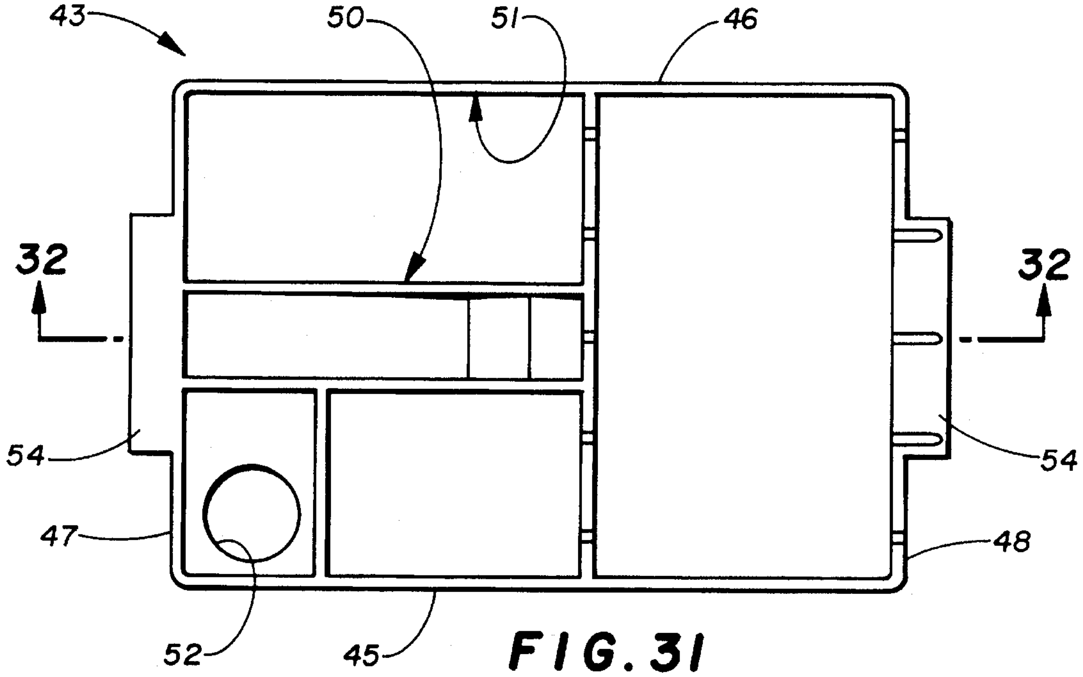
FIG. 31 is a top plan view of the insert tray of FIG. 30.

With reference to FIGS. 30–32, the insert tray 43 adapts the combination tray and wheeled cart 10 to an outdoor barbecue for use on a deck, terrace or lawn. The compartmentalized insert tray 43, for example, may hold paper plates 89, a spatula 90, salt and pepper shakers 91, a skewer 92, hamburger patties 93 and steaks 94, as well as other barbecue tools and accessories (not shown). A bag of charcoal 95 may be supported on the shelf 27.

With reference to FIGS. 33–35, the insert tray 44 adapts the combination tray and wheeled cart 10 for outdoor cleaning, such as washing, cleaning and/or waxing a car or other vehicle. The compartmentalized insert tray 44 may hold, for example, paper towels 96, a spray cleaner 97 for whitewalls or the car interior, steel wool 98 and a vinyl cleaner 99. Additionally, cans of car wax 100 and a chamois 101 may be kept on the shelf 27.

Figure 36:
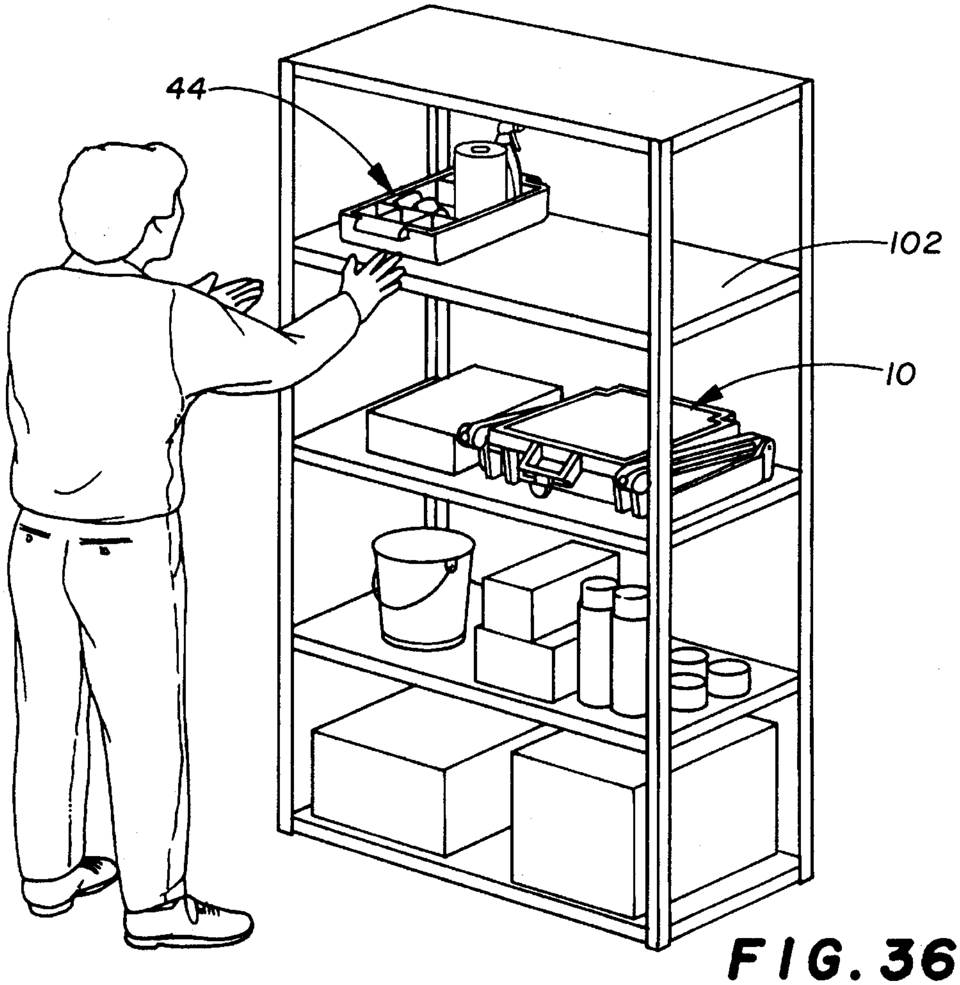
FIG. 36 is a pictorial view showing one of the insert trays being removed from storage along with the combination tray and wheeled cart, the latter shown in its first folded storage position, and the particular insert tray being adapted for car cleaning and polishing.
Figure 37:
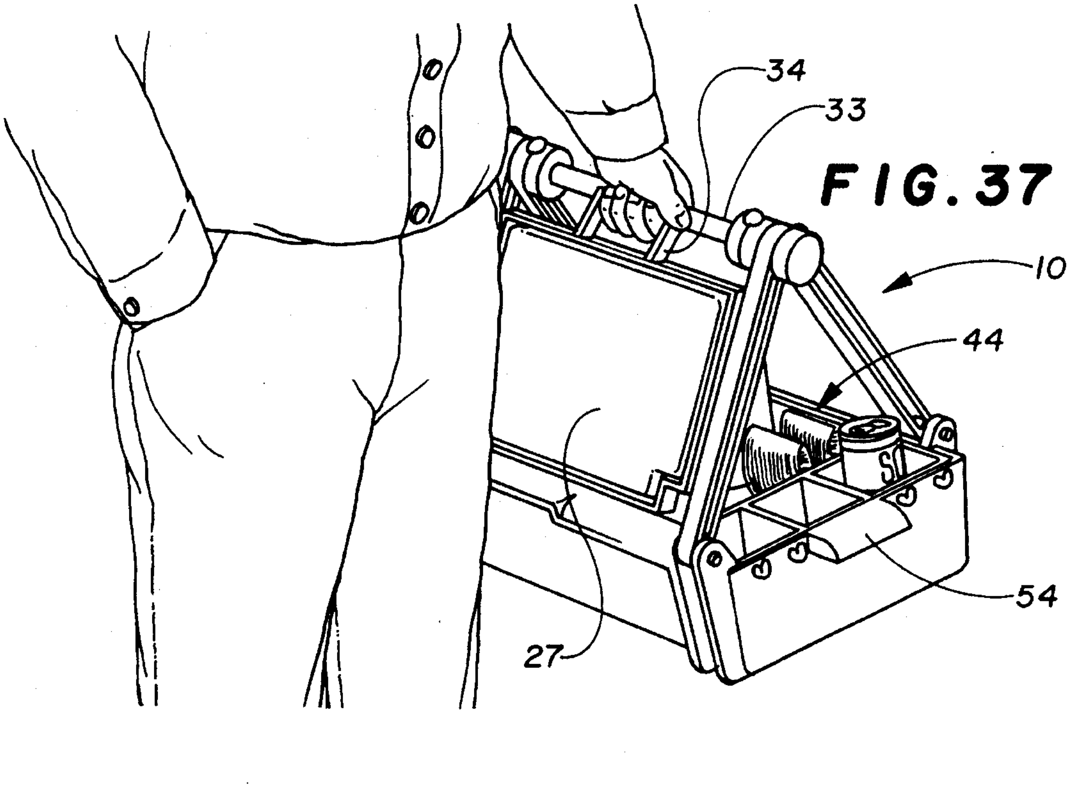
FIG. 37 is a further pictorial view, showing the combination tray and wheeled cart in its second intermediate carrying position, the particular insert tray being received therein.
Figure 38:
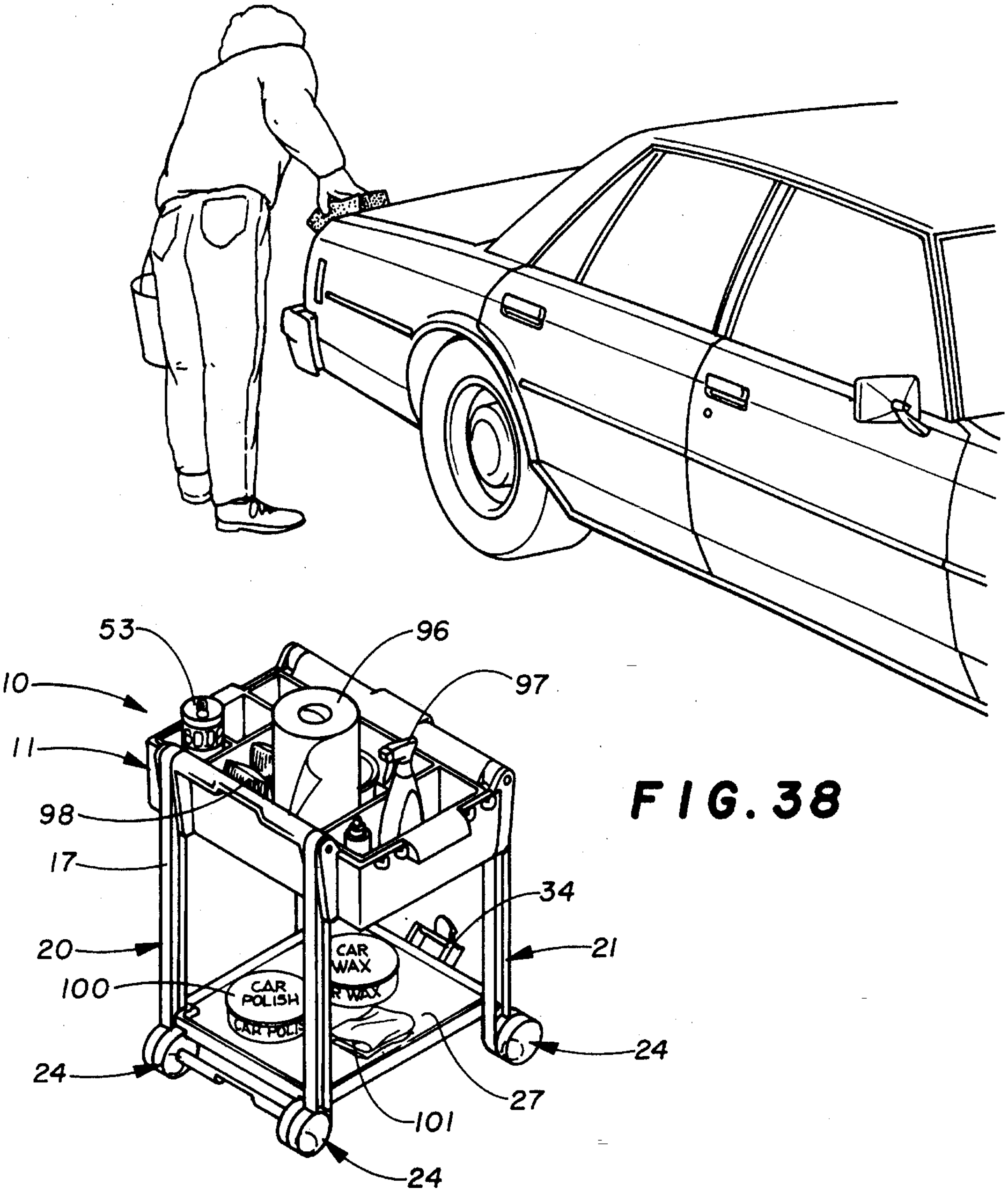
FIG. 38 is a still further pictorial view, showing the combination tray and wheeled cart in its third erected operational position on the job site (in this case, a driveway) for washing, cleaning and/or waxing a car.

With reference to FIGS. 36–38, the insert tray 44 may be stored on shelving 102 in a garage or utility room (FIG. 36) along with the combination tray and wheeled cart 10 of the present invention, the latter being shown in its initial folded-up storage position. The combination tray and wheeled cart 10 may be quickly set up in its second or intermediate carrying position (in the manner previously described with respect to FIGS. 9–15) and the insert tray 44 may be dropped into the tray 11 (FIG. 37). The combination tray and wheeled cart 10 (with its insert tray 44) may be quickly erected into its third operational position in the driveway, as shown more clearly in FIG. 38.

Thus it will be appreciated by those skilled in the art that the present invention provides a unique combination tray and wheeled cart (or mobile cart) 10 which is handy and convenient for general purpose use and which, by means of a variety of interchangeable insert trays, may be quickly adapted for a number of specific purposes, such as painting, repairs and maintenance, household cleaning, car cleaning and polishing, gardening, barbecuing, for serving purposes and the like. These interchangeable insert trays 39–44 may be color coded and contrasted with the color of the combination tray and cart 10, the latter constituting the basic unit. This basic unit 10, preferably with at least one insert tray 39–44, may be purchased initially; and, thereafter, additional insert trays (39–44) may be purchased as the need arises. This feature, together with the minimum number of parts, assures manufacturing standardization, good inventory control, and a variety of interchangeable merchandising options. All of the major components may be molded easily and economically using readily-available inexpensive materials for high-volume low-cost manufacture and widespread marketing and distribution. The initial folded position of the basic product has a low "profile" for easy storage as well as reduced shipping costs. The product is intended, primarily, as a consumer product for household use but may also be used for selected professional purposes, such as by a painter or an automobile mechanic. The combination tray and wheeled cart 10 has at least two and, preferably, three positions including an initial storage position, an intermediate carrying position (as a tray), and an erected operational position at the job site wherein, preferably, the combination tray and wheeled cart 10 is completely mobile and can be moved around quite easily. The combination tray and wheeled cart 10 may be quickly and conveniently folded up or moved from one position to another, and the combination tray and wheeled cart 10 is relatively lightweight, yet sturdy and reliable.

Obviously, many modifications may be made without departing from the basic spirit of the present invention. For example, additional insert trays may be provided for adapting the combination tray and wheeled cart 10 of the present invention for additional tasks and purposes, such as for serving purposes or for a sewing cart. Accordingly, it will be appreciated by those skilled in the art that within the scope of the appended claims, the invention may be practiced other than has been specifically described herein.

We claim:

1. A combination tray and cart, comprising a tray having a pair of sides, a first pair of spaced-apart legs joined by a first transverse member at outer ends thereof and pivotably mounted at inner ends to one of the sides of the tray, a second pair of spaced-apart legs joined by a second transverse member at outer ends thereof and pivotably mounted at inner ends to the other side of the tray, the combination tray and cart having a carrying position in which the first and second pairs of legs are disposed above the tray, angularly thereof to substantially form an apex, and in which both pairs of legs define an acute angle with respect to the tray, handle means for carrying the combination tray and cart to a job site, first releasable means for retaining the combination tray and cart in its carrying position, such that the first releasable means may be released to allow the first and second pairs of legs to be pivoted away from each other, outwardly of the respective sides of the tray and into a position in which the legs depend substantially downwardly of the tray, thereby defining an erected position for the combination tray and cart at the job site, and second releasable means for retaining the combination tray and cart in its erected position, the second releasable means including bracing means pivotably carried by the transverse member of one of the pair of legs, nested therebetween, and means for releasably securing the bracing means to the transverse member of the other pair of legs.

2. The combination tray and cart of claim 1, wherein the first pair of legs is pivoted about an axis which is substantially parallel to the one side of the tray and laterally offset therefrom, wherein the second pair of legs is pivoted about an axis which is substantially parallel to the other side of the tray and laterally offset therefrom, and wherein the first pair of legs is nested with respect to the second pair of legs, thereby providing an initial folded position for storage of the combination tray and cart.

3. The combination tray and cart of claim 2, wherein each side of the tray has pairs of spaced-apart bosses, wherein each leg is disposed between a pair of bosses, and wherein a pivot pin passes through the leg and the pair of bosses, thereby pivotably mounting the leg to the tray.

4. The combination tray and cart of claim 1, wherein each leg has a distal portion remote from the pivotable mounting of the leg, and wherein a caster means is provided on the distal end of each leg, such that the combination tray and cart may be moved about the job.

5. The combination tray and cart of claim 4, wherein the caster means comprises an enlarged cap integrally formed on the distal portion of each leg, a separable cap secured to the cap on the leg, thereby forming a caster housing, the caster housing having an opening formed therein, and a ball trapped in the caster housing and having a portion thereof extending through the opening in the caster housing.

6. The combination tray and cart of claim 1, wherein each leg is identical and is formed as an I-beam, and wherein the legs on the first pair of legs is reversed 180° with respect to the legs on the second pair of legs.

7. A combination tray and cart, comprising a tray having a pair of sides, a first pair of spaced-apart legs pivotably mounted to one of the sides of the tray, a second pair of spaced-part legs pivotably mounted to the other side of the tray, the combination tray and cart having a carrying position in which the first and second pairs of legs are disposed above the tray, angularly thereof to substantially form an apex, and in which both pairs of legs define an acute angle with respect to the tray, handle means for carrying the combination tray and cart to a job site, first releasable means for retaining the combination tray and cart in its carrying position, such that the first releasable means may be released to allow the first and second pairs of legs to be pivoted away from each other, outwardly of the respective sides of the tray and into a position in which the legs depend substantially downwardly of the tray, thereby defining an erected position for the combination tray and cart at the job site, and second releasable means for retaining the combination tray and cart in its erected position, wherein a shelf is pivotably mounted on the second pair of legs and is disposed below the tray.

8. The combination tray and cart of claim 7, wherein the shelf has a distal end remote from its pivotal mounting on the second pair of legs, and wherein the second releasable means comprises a pair of hooks carried by the distal end of the shelf, and the first pair of legs having respective ends, each of which is provided with a caster housing, and wherein each caster housing has an opening formed therein and further has a ledge adjacent to the opening, the hooks on the distal end of the shelf being received through the respective openings in the caster housings and engaging the respective ledges therein.

9. The combination tray and cart of claim 7, wherein the shelf has a handle formed thereon intermediate the pivotal mounting of the shelf to the second pair of legs, and wherein the first releasable means comprises a tab on the handle, the tab being provided with a hook, the first pair of legs having an axle therebetween, the axle having an opening formed therein and further having a notch adjacent to the opening, and the tab on the handle being received through the opening in the axle, such that the hook on the tab engages the notch.

10. A combination tray and table, comprising a tray having a pair of sides and further having a vertical longitudinal midplane between the respective sides, a first pair of legs pivotably mounted on one of the sides of the tray, a second pair of legs pivotably mounted on the other side of the tray, the combination tray and table having a first storage and carrying position in which the first and second pairs of legs are disposed above the tray, and in which each pair of legs defines an acute angle with respect to the tray, at least one of the pairs of legs including an overhead handle for carrying the combination tray and table, manually-releasable latching means between the respective pairs of legs, such that the latching means may be released, and such that the pairs of legs may then be pivoted away from each other and outwardly of the tray and into a position in which the legs depend downwardly from the tray, thereby defining a second erected position for the combination tray and table, and bracing means pivotably carried by the other pair of legs and engaging the overhead handle on the one pair of legs, thereby stabilizing the combination tray and table in its second erected position.

11. The combination tray and table of claim 10, further including wheel means on at least one of the respective pairs of legs.

12. The combination tray and table of claim 10, further including wheel means on each pair of legs.

13. The combination of claim 10, further including an insert tray removably received within the tray, thereby facilitating use of the tray and table for a particular purpose.

14. The combination of claim 13, wherein the insert tray is intended for use in interior painting.

15. The removable insert tray of claim 14, wherein the insert tray is intended for use with a roller for painting, and wherein the insert try has at least one compartment disposed between respective side walls and further has a sloping internal wall disposed longitudinally of the insert tray, such that the compartment has a shallow end and a deep end and is intended for holding paint, and the sloping internal wall having a plurality of spaced-apart transverse ribs parallel to the end walls, the ribs cooperating with the roller to remove excess paint therefrom.

16. The combination of claim 13, wherein the insert tray is intended for use with a barbecue.

17. The combination of claim 13, wherein the insert tray is intended for household cleaning purposes.

18. The combination of claim 13, wherein the insert tray is intended for use in carrying handyman's tools.

19. The combination of claim 13, wherein the insert tray is intended for use by gardeners.

20. The combination of claim 13, wherein the insert tray is intended for use on cleaning a vehicle.

21. The combination of claim 13, wherein the insert tray includes a bottom wall having a circular indentation formed therein, the circular indentation being formed to receive a standard beverage can.

22. A combination tray and wheeled cart, comprising a tray having respective sides, first and second pairs of legs pivotably mounted at inner ends to the sides of the tray, the pairs of legs being foldable to a substantially flat position disposed above the tray, an overhead handle formed by the two pairs of legs when pivoted partially away from the tray, such that the combination tray and wheeled cart has a first operational carrying position in which the combination tray and wheeled cart may be carried to a job site, the legs having respective end portions provided with wheel means, releasable latching means for interconnecting outer ends of the pairs of legs for retaining the combination tray and wheeled cart in its carrying position; wherein upon release of the latching means, the respective pairs of legs may be pivoted away from each other, outwardly of the respective sides of the tray, and into a position in which the legs depend downwardly of the tray substantially at right angles thereto, thereby defining a second operational position for the combination tray and wheeled cart, whereby the combination tray and wheeled cart may be moved about the job site, and releasable means for retaining the combination tray and wheeled cart in its second operational position, the releasable means including bracing means pivotably carried by outer ends of one of the pair of legs, nested therebetween, and means carried by outer ends of; the other pair of legs for releasably securing the bracing means thereto.

23. In a cart, the combination of a tray means having an open recessed compartment, respective first and second pairs of legs pivotably mounted at inner ends thereof to the tray means, the first and second pairs of legs being folded substantially flat with respect to the tray means, thereby defining a first storage position for the cart, the first and second pairs of legs being pivotable partially away from the tray means so as to be disposed above the tray means, thereby defining a second intermediate carrying position for the cart, handle means on outer ends of at least one of the pairs of legs for carrying the cart to a job site, first means releasably interconnecting outer ends of the pairs of legs for securing the legs in their carrying position and the first and second pairs of legs being further pivotable away from each other, outwardly of the tray means, and into a position in which the first and second pairs of legs depend downwardly of the tray means, thereby defining a third operational position for the cart on the job site, second means releasably interconnecting outer ends of the pairs of legs for securing the legs in their third position, and a plurality of insert trays, a selected one of which is received within the open recessed compartment of the tray means.

24. In a cart, the combination of a tray means, respective first and second pairs of legs pivotably mounted to the tray means, the first and second pairs of legs being folded substantially flat with respect to the tray means, thereby defining a first storage position for the cart, the first and second legs being pivoted partially away from the tray means so as to be disposed above the tray means, thereby defining a second intermediate carrying position for the cart, handle means on at least one of the pairs of legs for carrying the cart to a job site, and the first an second pairs of legs being pivoted away further from each other, outwardly of the tray means, and into a position in which the first and second pairs of legs depend downwardly of the tray means, thereby defining a third operational position for the cart on the job site, further including respective releasable latching means for the respective first and second pairs of legs in the second and third positions of the cart, respectively.

25. The combination of claim 24, wherein the first and second pairs of legs have respective distal ends, and wherein caster means is provided on the respective distal ends of at least one of the first and second pairs of legs, such that the cart may be easily moved about the job site.

26. The combination of claim 24, wherein the respective first and second pairs of legs are at least partially nested with respect to each other in the first storage position of the cart.

27. The combination of claim 24, wherein the tray means comprises a tray having respective parallel sides, and wherein the first and second pairs of legs are pivotably mounted to the respective sides of the tray.

28. A combination tray and cart, comprising a frame means having a handle and further having a plurality of articulated legs which are pivoted at inner ends to the frame means, such that the combination tray and cart has a first storage position in which the legs are folded substantially flat against the frame means, a second intermediate carrying position in which the legs are disposed above the frame means, first means for latching outer ends of the legs together to form a carrying handle, such that the combination tray and cart is carried by the handle to a job site, and a third erected operational position in which the articulated legs are extended from the frame means and depend downwardly therefrom, and second means for interconnecting outer ends of the legs in their erected operational position, the frame means having an open recessed compartment, and a plurality of insert trays, such that a selected insert tray may be removably received on the frame means and substantially occupies the open recessed compartment therein, and each of the insert trays having a plurality of divider walls separating the respective insert tray into a plurality of compartments suitable for a particular purpose.

29. In combination, a portable foldable mobile work station having a main body portion, a plurality of insert trays, a selected one of which is receivable within and occupying a substantial part of an open recessed compartment of the main body portion of the work station, thereby accommodating a variety of tasks, the work station further having two pairs of leg members, each leg member having respective caster means thereon, and each leg member being pivotably connected at inner ends to the main body portion thereof, such that the work station has a first folded storage position for compactness in which the leg members are folded and are disposed in an overlapping manner above the recessed compartment of the main body portion of the work station and substantially parallel thereto, the work station further having a second intermediate carrying position in which the leg members are pivoted upwardly and away from the main body portion thereof, the leg members extending at an acute angle with respect to the main body portion of the work station and first means interconnecting outer ends of the leg members to form an overhead carrying handle for the work station, thereby conveniently carrying the selected insert tray when received within the recessed compartment to the job site, and the work station still further having a third erected position in which the leg members are further pivoted outwardly away from the main body portion of the work station and downwardly therefrom to thereby depend from the work station, the legs members having second means at their outer ends for securing the leg members in their third erected position.

* * * * *